(12) United States Patent
Lee et al.

(10) Patent No.: US 11,520,476 B2
(45) Date of Patent: Dec. 6, 2022

(54) ELECTRONIC APPARATUS DISPLAYING REPRESENTATIVE INFORMATION AND CONTROL METHOD THEREOF

(71) Applicant: Samsung Electronics Co., Ltd., Suwon-si (KR)

(72) Inventors: Jae-Myoung Lee, Seoul (KR); Chul-Ho Jang, Seoul (KR); Hyung-Joo Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 17/346,770

(22) Filed: Jun. 14, 2021

(65) Prior Publication Data

US 2021/0303146 A1   Sep. 30, 2021

Related U.S. Application Data

(63) Continuation of application No. 16/038,502, filed on Jul. 18, 2018, now Pat. No. 11,036,383, which is a continuation of application No. 14/177,696, filed on Feb. 11, 2014, now abandoned.

(30) Foreign Application Priority Data

Mar. 8, 2013   (KR) .................. 10-2013-0025057

(51) Int. Cl.
  *G06F 3/04855*   (2022.01)
  *G06F 3/0485*   (2022.01)
  *G06F 3/04883*   (2022.01)

(52) U.S. Cl.
  CPC ........ *G06F 3/04855* (2013.01); *G06F 3/0485* (2013.01); *G06F 3/04883* (2013.01)

(58) Field of Classification Search
  None
  See application file for complete search history.

(56) References Cited

U.S. PATENT DOCUMENTS

| 5,818,439 | A  | 10/1998 | Nagasaka et al. |
| 9,081,495 | B2 | 7/2015  | Cheong et al. |
| 9,110,579 | B2 | 8/2015  | Miyazaki |
| 9,218,067 | B2 | 12/2015 | Kruzeniski et al. |
| 9,864,481 | B2 | 1/2018  | Misawa |

(Continued)

FOREIGN PATENT DOCUMENTS

| CN | 102207820 A | 10/2011 |
| CN | 102263856 A | 11/2011 |

(Continued)

OTHER PUBLICATIONS

Korean Office Action dated Oct. 2, 2019, issued in Korean Patent Application No. 10-2013-0025057.

(Continued)

*Primary Examiner* — Toan H Vu
(74) *Attorney, Agent, or Firm* — Jefferson IP Law, LLP

(57) ABSTRACT

A method of controlling an electronic apparatus that displays representative information is provided. The method includes displaying the content on a display unit, detecting a gesture for scrolling the content, scrolling the content upon the gesture being detected, extracting representative information of the content, displaying the representative information of the content, and stopping the scrolling of the content.

10 Claims, 14 Drawing Sheets

(56) References Cited

U.S. PATENT DOCUMENTS

| | | |
|---|---|---|
| 10,656,818 B1 | 5/2020 | Winters et al. |
| 2002/0054158 A1 | 5/2002 | Asami |
| 2007/0150830 A1 | 6/2007 | Ording et al. |
| 2008/0016451 A1 | 1/2008 | Funabashi et al. |
| 2008/0086703 A1 | 4/2008 | Flynt et al. |
| 2008/0178120 A1 | 7/2008 | Yamamoto |
| 2008/0195969 A1 | 8/2008 | Brown et al. |
| 2008/0209325 A1 | 8/2008 | Suito et al. |
| 2008/0250037 A1 | 10/2008 | Date et al. |
| 2009/0307633 A1 | 12/2009 | Haughay, Jr. et al. |
| 2010/0026842 A1 | 2/2010 | Ishizaka |
| 2010/0070523 A1 | 3/2010 | Delgo et al. |
| 2010/0070894 A1* | 3/2010 | Krishnamurthy ..... G06F 3/0481 715/764 |
| 2010/0099448 A1 | 4/2010 | Yim et al. |
| 2010/0115398 A1 | 5/2010 | Yi |
| 2010/0123734 A1* | 5/2010 | Ozawa ................ G06F 3/0488 345/619 |
| 2011/0099522 A1 | 4/2011 | Kim et al. |
| 2011/0246942 A1 | 10/2011 | Misawa |
| 2011/0265002 A1 | 10/2011 | Hong et al. |
| 2011/0273479 A1 | 11/2011 | Ingrassia, Jr. et al. |
| 2012/0005623 A1 | 1/2012 | Ishak et al. |
| 2012/0066630 A1 | 3/2012 | Kim et al. |
| 2012/0102426 A1 | 4/2012 | Kim et al. |
| 2012/0106917 A1* | 5/2012 | Momosaki ............ H04N 5/765 386/230 |
| 2012/0206498 A1 | 8/2012 | Kai et al. |
| 2012/0266103 A1 | 10/2012 | Shah |
| 2012/0290971 A1 | 11/2012 | Takami |
| 2012/0317476 A1 | 12/2012 | Goldman et al. |
| 2013/0007587 A1 | 1/2013 | Marantz et al. |
| 2013/0106737 A1 | 5/2013 | Hong et al. |
| 2013/0120460 A1 | 5/2013 | Adams et al. |
| 2013/0212470 A1 | 8/2013 | Karunamuni et al. |
| 2013/0268867 A1 | 10/2013 | Martin et al. |
| 2013/0300664 A1 | 11/2013 | Winer |
| 2013/0318133 A1 | 11/2013 | Rajabi et al. |
| 2013/0326398 A1 | 12/2013 | Zuverink et al. |
| 2014/0053066 A1 | 2/2014 | Imamura |
| 2014/0059487 A1* | 2/2014 | Baumann ............... G06F 3/0482 715/811 |
| 2014/0089110 A1 | 3/2014 | Kazama |
| 2014/0152585 A1 | 6/2014 | Andersson Reimer |
| 2014/0157177 A1* | 6/2014 | Ghadge ............. G06Q 10/1093 715/772 |
| 2014/0189524 A1 | 7/2014 | Murarka et al. |
| 2014/0215340 A1 | 7/2014 | Shetty et al. |
| 2014/0245213 A1 | 8/2014 | Gardenfors et al. |
| 2015/0143303 A1* | 5/2015 | Sarrazin ............... G06Q 10/109 715/854 |
| 2015/0317062 A1 | 11/2015 | Jarrett et al. |
| 2016/0139736 A1* | 5/2016 | Frank .................... G06T 11/206 705/5 |
| 2016/0202859 A1* | 7/2016 | Anzures .............. G06F 3/03545 715/784 |
| 2016/0328932 A1 | 11/2016 | Kniffen et al. |
| 2017/0336922 A1* | 11/2017 | Vaskevitch ........... G06F 3/0481 |
| 2020/0264740 A1* | 8/2020 | Duarte ..................... G06F 3/017 |

FOREIGN PATENT DOCUMENTS

| | | |
|---|---|---|
| CN | 102693076 A | 9/2012 |
| CN | 102790826 A | 11/2012 |
| EP | 2490111 A2 | 8/2012 |
| JP | 2010-107688 A | 5/2010 |
| KR | 10-2010-0090382 A | 8/2010 |
| KR | 10-2012-0040898 A | 4/2012 |
| KR | 10-2012-0124817 A | 11/2012 |
| WO | 2012-147720 A1 | 11/2012 |
| WO | 2010/006334 A1 | 1/2020 |

OTHER PUBLICATIONS

Chinese Office Action dated Nov. 17, 2021, issued in Chinese Application No. 201910496664.4.

* cited by examiner

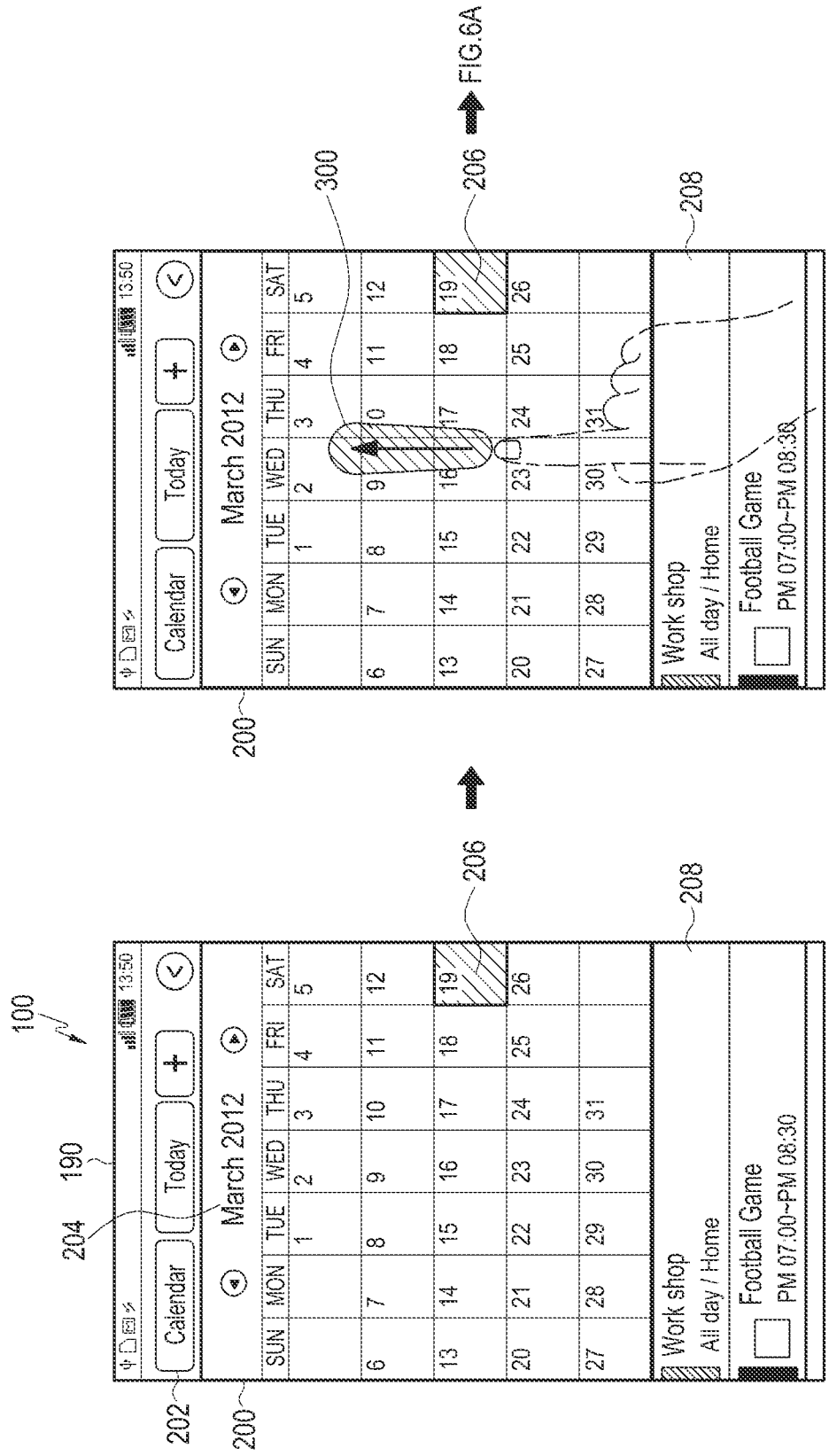

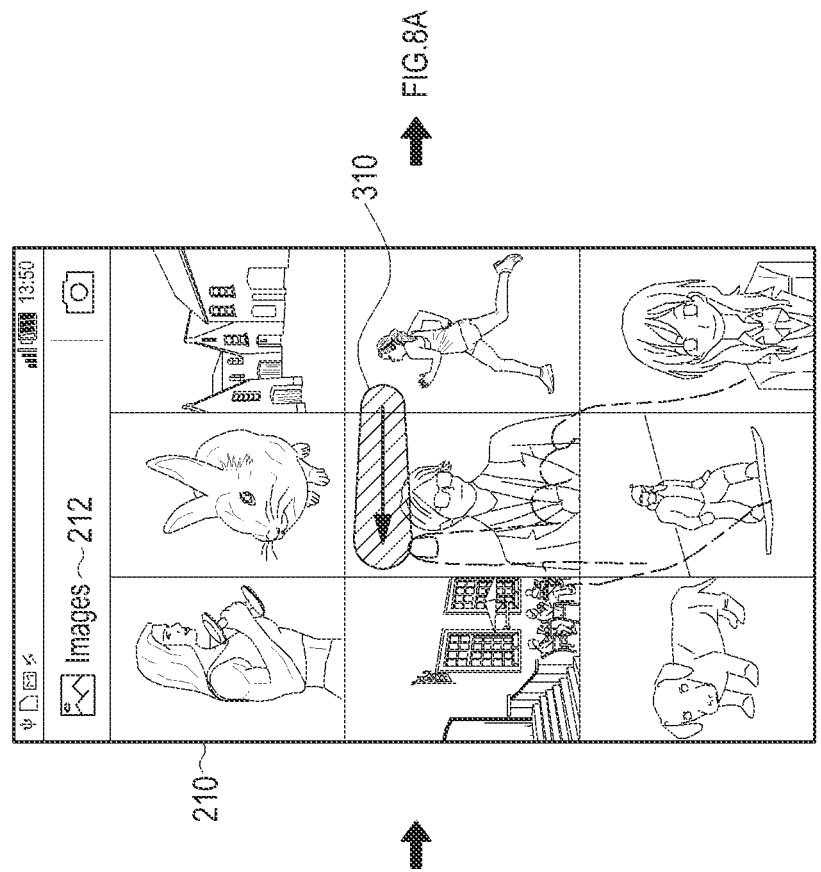
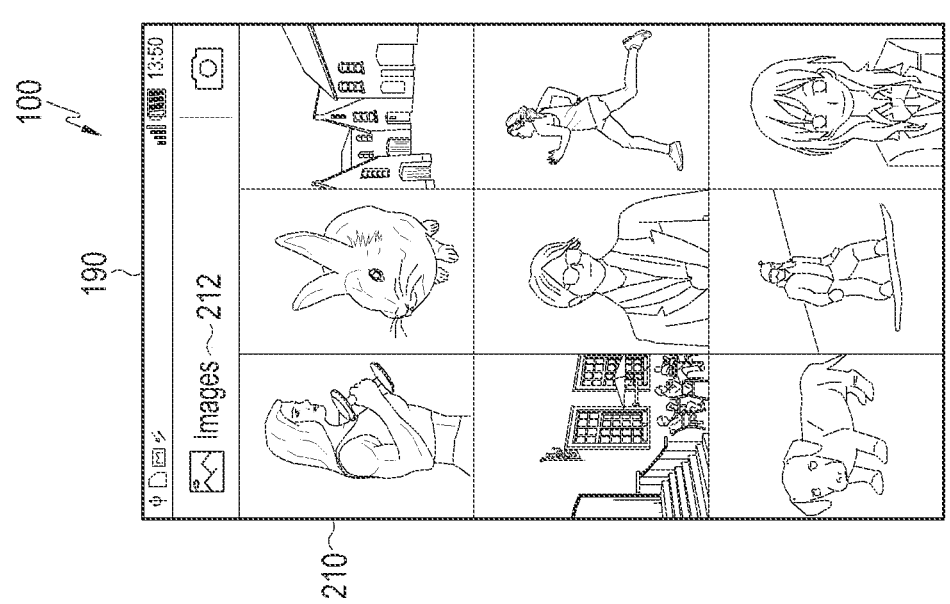
FIG.7A
FIG.7B

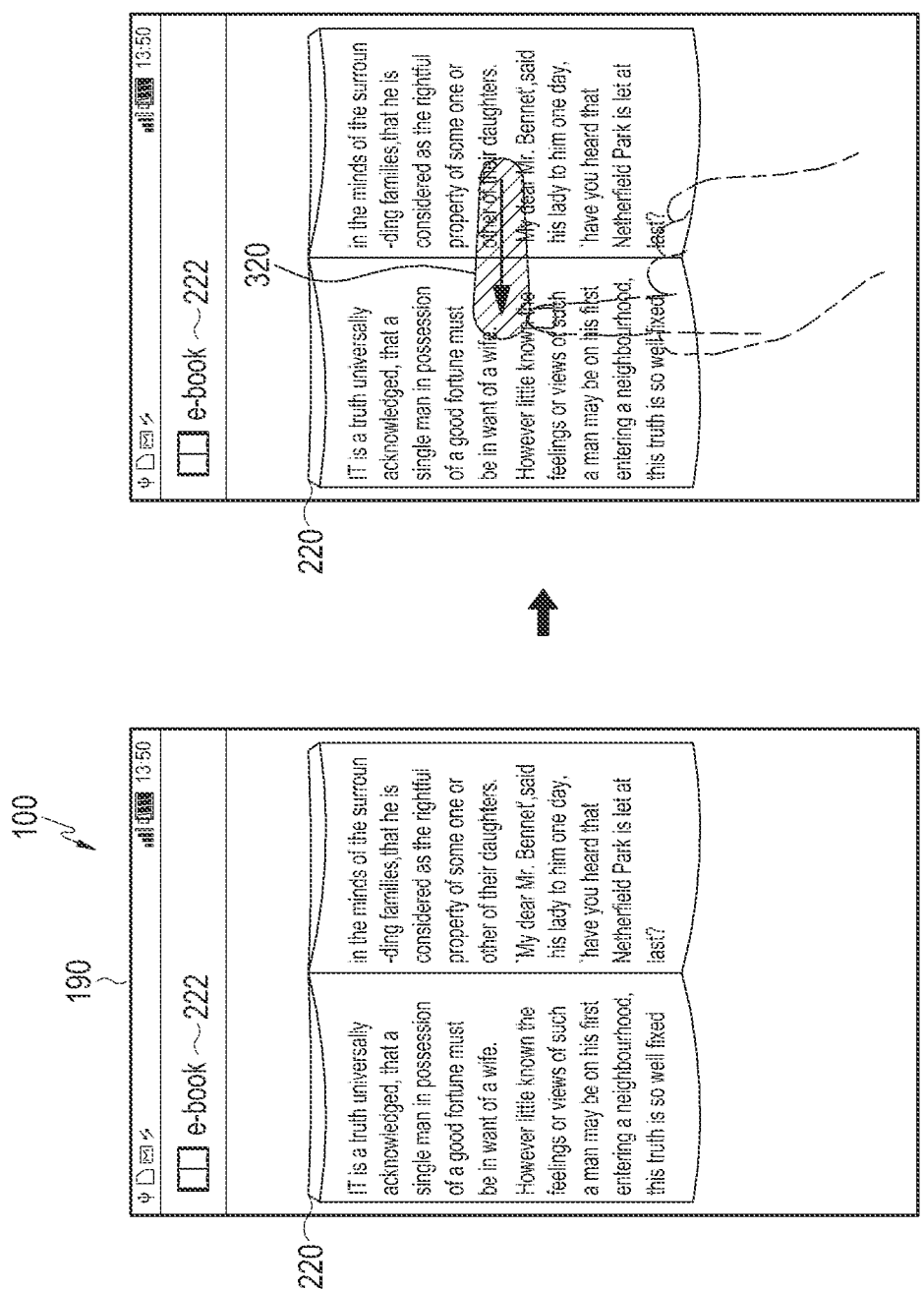

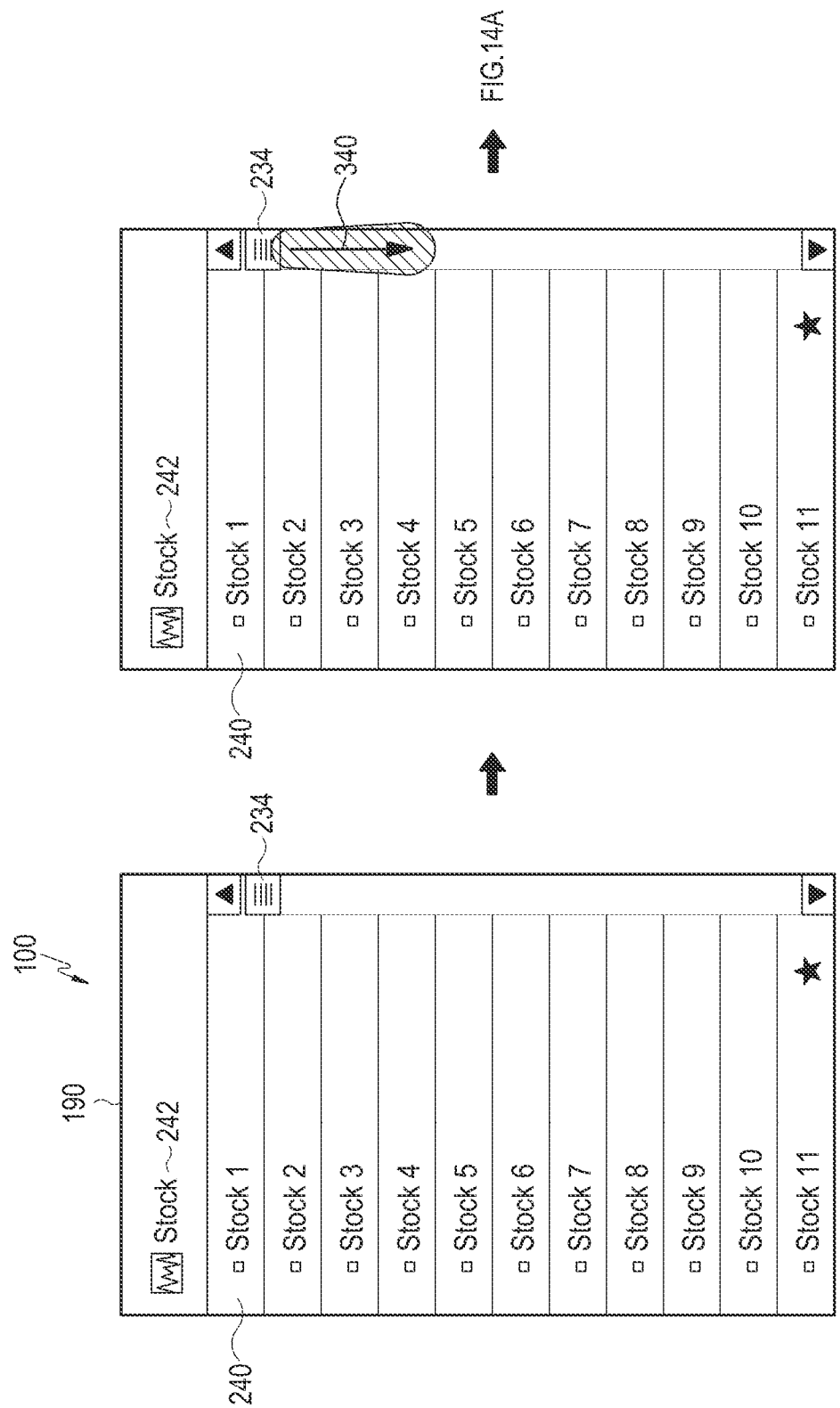

ELECTRONIC APPARATUS DISPLAYING REPRESENTATIVE INFORMATION AND CONTROL METHOD THEREOF

PRIORITY

This application is a continuation of prior application Ser. No. 16/038,502, filed on Jul. 18, 2018, which has issued as U.S. Pat. No. 11,036,383, on Jun. 15, 2021, and which is a continuation application of prior application Ser. No. 14/177,696, filed on Feb. 11, 2014, which is based on and claims priority under 35 U.S.C. § 119(a) of a Korean patent application number 10-2013-0025057, filed on Mar. 8, 2013 in the Korean Intellectual Property Office, the disclosure of each of which is incorporated by reference herein in its entirety.

BACKGROUND OF THE INVENTION

1. Field of the Invention

The present disclosure relates to an electronic apparatus and a control method thereof. For example, the present disclosure relates to an electronic apparatus that displays scrolling content and a control method thereof.

2. Description of the Related Art

Recently, in electronic apparatuses, various applications are executed to provide users with various services. Further, during the execution of the application, the content is displayed on the display unit.

At this point, if all the content is not displayed in one screen, the electronic apparatuses provide techniques of scrolling the content.

However, when scrolling the content, if the scroll is performed quickly, it may be difficult for a user to recognize what the content is that is being scrolled. In addition, when scrolling the content, a special service is not provided other than the scrolling function, in general.

Accordingly, when quick scrolling, it has been desired to provide a technique that enables the user to recognize what the content is about, and to provide additional services in addition to the scrolling function.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present disclosure are to address at least the above-mentioned problems and/or disadvantages and to provide at least the advantages described below. Accordingly, an aspect of the present disclosure is to provide an electronic apparatus that displays representative information of content when scrolling the content, and a control method thereof.

An aspect of the present disclosure is to provide an electronic apparatus that displays and provides representative information of the list items other than the scrolling function, when scrolling list items corresponding to contents, and a control method thereof.

In accordance with an aspect of the present disclosure, a method of controlling an electronic apparatus that displays representative information when scrolling content is provided. The method includes displaying the content on a display unit, detecting a gesture for scrolling the content, scrolling the content upon the gesture being detected, extracting representative information of the content, displaying the representative information of the content, and stopping the scrolling of the content.

In accordance with an aspect of the present disclosure, an electronic apparatus that displays representative information when scrolling content is provided. The electronic apparatus includes a controller, a display unit that displays the content and the representative information of the content, and a storage unit that stores the content. The controller controls to display the content, detects a gesture for scrolling the content, scrolls the content upon the gesture being detected, extracts the representative information of the content, controls to display the representative information of the content, and stops the scrolling of the content.

According to an exemplary embodiment of the present disclosure, when scrolling content, the user may instantly recognize what the currently scrolled content is about, by displaying the representative information of the content.

According to an exemplary embodiment of the present disclosure, when scrolling content, in addition to the scrolling function, the representative information of the list items is displayed and provided.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIGS. 5A, 5B, 6A, and 6B are diagrams illustrating screens that display representative information when scrolling content according to an exemplary embodiment of the present disclosure;

FIGS. 7A, 7B, 8A, and 8B are diagrams illustrating screens that display representative information when scrolling content according to a first exemplary embodiment of the present disclosure;

FIGS. 9A, 9B, 10A, and 10B are diagrams illustrating screens that display representative information when scrolling content according to a second exemplary embodiment of the present disclosure;

FIGS. 13A, 13B, 14A, and 14B are diagrams illustrating screens that display the representative information when scrolling content according to another exemplary embodiment of the present disclosure.

Throughout the drawings, it should be noted that like reference numbers are used to depict the same or similar elements, features, and structures.

DETAILED DESCRIPTION OF EXEMPLARY EMBODIMENTS

Figure 1:
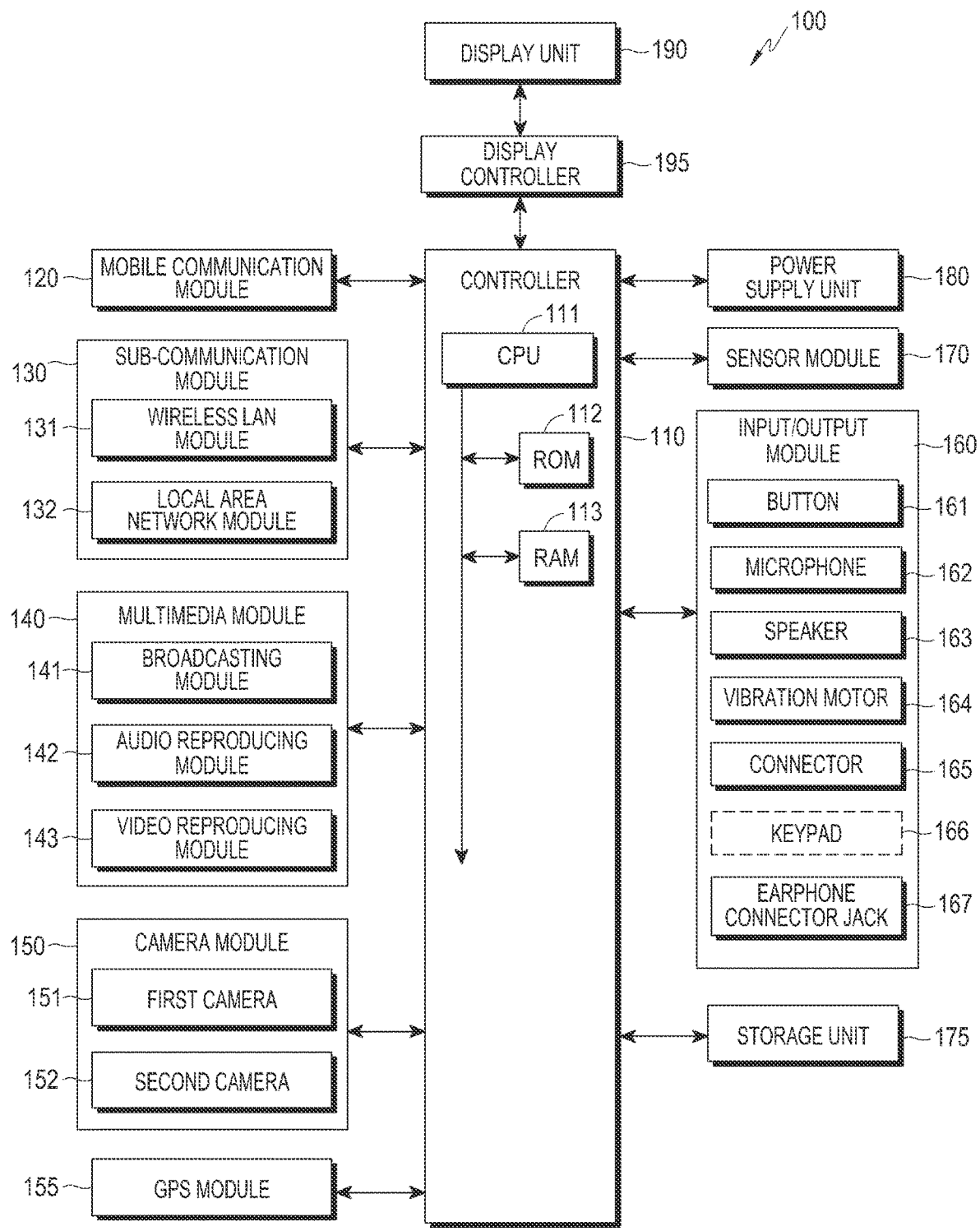
FIG. 1 is a schematic block diagram illustrating a mobile device according to an exemplary embodiment of the present disclosure.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, terms, such as first, second, or the like may be used herein when describing components of the present disclosure, but the components are not limited by the terminology. Each of these terminologies is not used to define an essence, order or sequence of a corresponding component but used merely to distinguish the corresponding component from other component(s). For example, a first component may be named as a second component, without departing from the scope of the claims of the present disclosure, and similarly a second component may be named as a first exemplary embodiment. The term "and/or" includes a combination of related items or any one of the related items.

It should be noted that if it is described in the specification that one component is "connected," "coupled," or "joined" to another component, a third component may be "connected," "coupled," and "joined" between the first and second components, although the first component may be directly connected, coupled or joined to the second component. As long as defined otherwise, a singular expression includes a plural expression. The terms "comprise," "include," "have," and any variations thereof is intended to include the presence of stated features, integers, operations, components, but not to preclude the presence or addition of one or more features, integers, operations, components or groups thereof.

Unless otherwise defined, all terms including technical and scientific terms used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

An electronic apparatus according to an exemplary embodiment of the present disclosure corresponds to a device such as a personal computer, a mobile device, or a smart television (TV). Herein, though the present disclosure includes an example of a mobile device, the present disclosure is not limited to the mobile device.

FIG. 1 is a schematic block diagram illustrating a mobile device according to an exemplary embodiment of the present disclosure.

With reference to FIG. 1, a device 100 may be connected to an external device (not illustrated) using an external device connecting unit such as a sub-communication module 130, a connector 165, and an earphone connector jack 167. The "external device" may include various devices which are detachably attached to the device 100 and connectable by wire, such as an earphone, an external speaker, a Universal Serial Bus (USB) memory, a recharger, a cradle, a docking station, a Digital Multimedia Broadcasting (DMB) antenna, a mobile payment related device, a health care device (e.g., a blood glucose meter or the like), a game machine, and a car navigation device. Further, the "external device" may include a Bluetooth communication device that is wirelessly connectable to the device 100 via a Local Area Network (LAN), a local area network device such as a Near Field Communication (NFC) device, a WiFi Direct communication device, and a wireless Access Point (AP). In addition, the external device may include other devices such as a cellular phone, a smart phone, a tablet Personal Computer (PC), a desktop PC, and a server.

With reference to FIG. 1, the device 100 includes a display unit 190 and a display controller 195. In addition, the device 100 includes a controller 110, a mobile communication module 120, a sub-communication module 130, a multimedia module 140, a camera module 150, a Global Positioning System (GPS) module 155, an input/output module 160, a sensor module 170, a storage unit 175, and a power supply unit 180. The sub-communication module 130 includes at least one of a wireless LAN module 131 and a local area network module 132, and the multimedia module 140 includes at least one of a broadcasting module 141, an audio reproducing module 142, and a video reproducing module 143. The camera module 150 includes at least one of a first camera 151 and a second camera 152, and the input/output module 160 includes at least one of buttons 161, a microphone 162, a speaker 163, a vibration motor 164, a connector 165, a keypad 166, and an earphone connector jack 167. Herein, the description is made with an example in which the display unit 190 and the display controller 195 are a touch screen and a touch screen controller, respectively.

The controller 110 may include a Central Processing Unit (CPU) 111, a Read Only Memory (ROM) 112 that stores a control program for control of the device 100, and a Random Access Memory (RAM) 113 that stores a signal or data input from the outside of the device 100, or that is used as a storage area for an operation performed in the device 100. The CPU 111 may include a single core, dual cores, triple cores, or quad cores. The CPU 111, the ROM 112, and the RANI 113 may be interconnected via an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 enables the device 100 to be connected to an external device through a mobile communication, in which the mobile communication module 120 may use either one antenna or a plurality of antennas (not illustrated), under the control of the controller 110. The mobile communication module 120 transmits/receives a wireless signal for a voice communication, a video communication, a Short Message Service (SMS) message (i.e., a text message) or a Multimedia Message Service (MMS) message with respect to a cellular phone (not illustrated), a smart phone (not illustrated), a tablet PC, or other devices (not illustrated) each of which has a phone number stored in the device 100.

The sub-communication module 130 may include at least one of the wireless LAN module 131 and the local area network module 132. For example, the sub-communication module 130 may include the wireless LAN module 131 only, the local area network module 132 only, or both of the wireless LAN module 131 and the local area network module 132.

The wireless LAN module 131 may be connected to the Internet at a location where a wireless AP (not illustrated) is installed, under the control of the controller 110. The wireless LAN module 131 conforms to a wireless LAN standard (e.g., IEEE 802.11x) of the Institute of Electrical and Electronics Engineers (IEEE). The local area network module 132 may wirelessly perform a local area network communication between the device 100 and an image forming device (not illustrated), under the control of the controller 110. The local area network scheme may include Bluetooth, an Infrared Data Association (IrDA) communication, a WiFi-Direct communication, or a Near Field Communication (NFC).

The device 100 may include at least one of the mobile communication module 120, the wireless LAN module 131, and the local area network module 132, depending on the performance. For example, the device 100 may include a combination of the mobile communication module 120, the wireless LAN module 131, and the local area network module 132, depending on the performance.

The multimedia module 140 includes the broadcasting module 141, the audio reproducing module 142, or the video reproducing module 143. The broadcasting module 141 may receive a broadcasting signal (for example, a TV broadcasting signal, a radio broadcasting signal, or a data broadcasting signal) sent from a broadcasting station via a broadcasting antenna (not illustrated) and additional broadcasting information (for example, Electric Program Guide (EPG) or Electric Service Guide (ESG)), under the control of the controller 110. The audio reproducing module 142 may reproduce a digital audio file (for example, a file with a filename extension of mp3, wma, ogg, or way) stored or received under the control of the controller 110. The video reproducing module 143 may reproduce a digital movie file (for example, a file with a filename extension of mpeg, mpg, mp4, avi, mov, or mkv) stored or received under the control of the controller 110. The video reproducing module 143 may reproduce a digital audio file.

The multimedia module 140 may include the audio reproducing module 142 and the video reproducing module 143, without including the broadcasting module 141. In addition, the audio reproducing module 142 or the video reproducing module 143 of the multimedia module 140 may be included in the controller 110.

The camera module 150 may include at least one of the first camera 151 and the second camera 152 that captures a still image or a moving image, under the control of the controller 110. In addition, the first camera 151 or the second camera 152 may include an auxiliary light source (for example, a flash (not illustrated)) that provides light intensity used for the capturing. The first camera 151 may be mounted on the front surface of the device 100, and the second camera 152 may be mounted on the back surface of the device 100. Otherwise, the first camera 151 and the second camera 152 may be mounted to neighbor each other (for example, with a distance between the first camera 151 and the second camera 152 being longer than 1 cm and shorter than 8 cm) so that a three-dimensional still image or a three-dimensional moving image may be captured.

The GPS module 155 may receive radio waves from a plurality of GPS satellites (not illustrated) in Earth orbit, and may calculate the location of the device 100 using the time of arrival from the GPS satellites (not illustrated) to the device 100.

The input/output module 160 may include at least one of a plurality of buttons 161, the microphone 162, the speaker 163, the vibration motor 164, the connector 165, and the keypad 166.

The buttons 161 may be arranged on the front surface, the side surface, or the back surface of the device 100, and may include at least one of a power/lock button, a volume button, a menu button, a home button, a back button, and a search button.

The microphone 162 generates an electric signal corresponding to an input of a voice or a sound under the control of the controller 110.

The speaker 163 may output a sound corresponding to various signals (for example, a wireless signal, a broadcasting signal, a digital audio file, a digital video file, or image capturing) of the mobile communication module 120, the sub-communication module 130, the multimedia module 140, or the camera module 150, to the outside of the device 100 under the control of the controller 110. The speaker 163 may output a sound corresponding to the function performed by the device 100 (for example, a button operation sound corresponding to a phone call, or a ring back tone). One or a plurality of speakers 163 may be formed at an appropriate position(s) on the housing of the device 100.

The vibration motor 164 may convert an electric signal to a mechanical vibration under the control of the controller 110. For example, when the device 100 is in a silent mode, if a voice communication is received from another device (not illustrated), the vibration motor 164 operates. One or a plurality of vibration motors 164 may be formed in the housing of the device 100. The vibration motor 164 may operate in response to the touch operation of the user who touches the touch screen 190 and the continuous movement of a touch on the touch screen 190.

The connector 165 may be used as an interface to connect the device 100 and an external device (not illustrated) or a power source (not illustrated). The device 100 transmits data stored in the storage unit 175 of the device 100 to the external device (not illustrated) or receives data from the external device (not illustrated) via a wire cable connected to the connector 165 under the control of the controller 110. At this point, the external device may be a docking station, and the data may be, for example, an input signal transmitted from an external input device, from a mouse, a keyboard, or the like. In addition, the device 100 receives electric power from a power source (not illustrated) via a wire cable connected to the connector 165, or recharge a battery (not illustrated) using the power source.

The keypad 166 may receive key input from a user to control the device 100. The keypad 166 includes a physical keypad (not illustrated) formed on the device 100 or a keypad (not illustrated) displayed on the touch screen 190. The physical keypad (not illustrated) formed on the device 100 may be excluded depending on the performance or the structure of the device 100.

An earphone (not illustrated) is inserted to an earphone connector jack 167 to be connected to the device 100.

The sensor module 170 includes at least one sensor that detects a state of the device 100. For example, the sensor module 170 may include a proximity sensor that detects whether a user is close to the device 100 and an illuminance sensor that detects the light intensity around the device 100. In addition, the sensor module 170 may include a gyro sensor. The gyro sensor may detect a movement (for example, rotation of the device 100, or acceleration or a vibration applied to the device 100) of the device 100, may detect a point of the compass using the Earth's magnetic field, and may detect a working direction of the gravity. In addition, the sensor module 170 may include an altimeter that detects an altitude by measuring atmospheric pressure. The at least one sensor may detect a state, generate a signal corresponding to the detection, and transmit the generated signal to the controller 110. The at least one sensor of the sensor module 170 may be added or removed, depending on the performance of the device 100.

The storage unit 175 may store a signal or data which is input/output corresponding to movements of the mobile communication module 120, the sub-communication module 130, the multimedia module 140, the camera module 150, the GPS module 155, the input/output module 160, the sensor module 170, and the touch screen 190, under the control of the controller 110. The storage unit 175 may store a control program to control the device 100 or the controller 110 and applications.

The term "storage unit" includes the storage unit 175, the ROM 112 in the controller 110, the RAM 113, or a memory card (not illustrated) (for example, a Secure Digital (SD) card or a memory stick) mounted on the device 100. The storage unit may include a non-volatile memory, a volatile memory, a Hard Disk Drive (HDD), or a Solid State Drive (SSD).

The power supply unit 180 may supply power to one or a plurality of batteries (not illustrated) disposed in the housing of the device 100 under the control of the controller 110. One or a plurality of batteries (not illustrated) supply power to the device 100. In addition, the power supply unit 180 supplies electric power being input from an external power source (not illustrated) through a wire cable connected to the connector 165 to the device 100. In addition, the power supply unit 180 may supply electric power being wirelessly input from an external power source using a wireless recharging scheme to the device 100.

The touch screen 190 may provide users with a user interface corresponding to various services (for example, a communication, data transmission, broadcasting, or image capturing). The touch screen 190 may transmit an analog signal corresponding to at least one touch being input to the user interface to the touch screen controller 195. The touch screen 190 may be input at least one touch by using the body of the user (for example, a finger including a thumb) or a touchable input means (for example, a stylus pen). In addition, the touch screen 190 may be input with a continuous movement of one touch among at least one touch. The touch screen 190 may transmit an analog signal corresponding to the input continuous movement of the touch to the touch screen controller 195.

The touch of the present disclosure is not limited to a contact of the touch screen 190 with the body of the user or the touchable input means, and the touch may include a non-contact touch. The distance that can be detected by the touch screen 190 may be changed depending on the performance or the structure of the device 100.

The touch screen 190 may be implemented by a resistive scheme, a capacitive scheme, an infrared scheme, or an acoustic wave scheme.

The touch screen controller 195 converts an analog signal received from the touch screen 190 to a digital signal (for example, X and Y coordinates) and transmits the converted digital signal to the controller 110. The controller 110 may control the touch screen 190 using the digital signal received from the touch screen controller 195. For example, the controller 110 responds to the touch so that a shortcut icon (not illustrated) displayed on the touch screen 190 is selected or a shortcut icon (not illustrated) is executed. Further, the touch screen controller 195 may be included in the controller 110.

Figure 2:
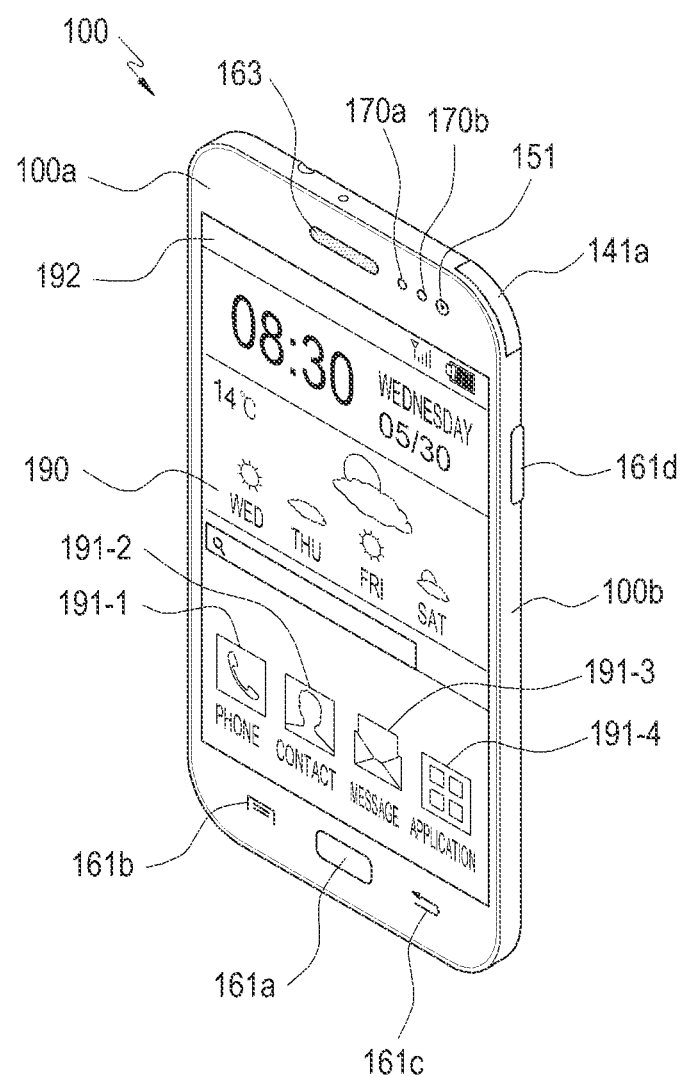
FIG. 2 is a perspective view of a front surface of a mobile device according to an exemplary embodiment of the present disclosure.
Figure 3:
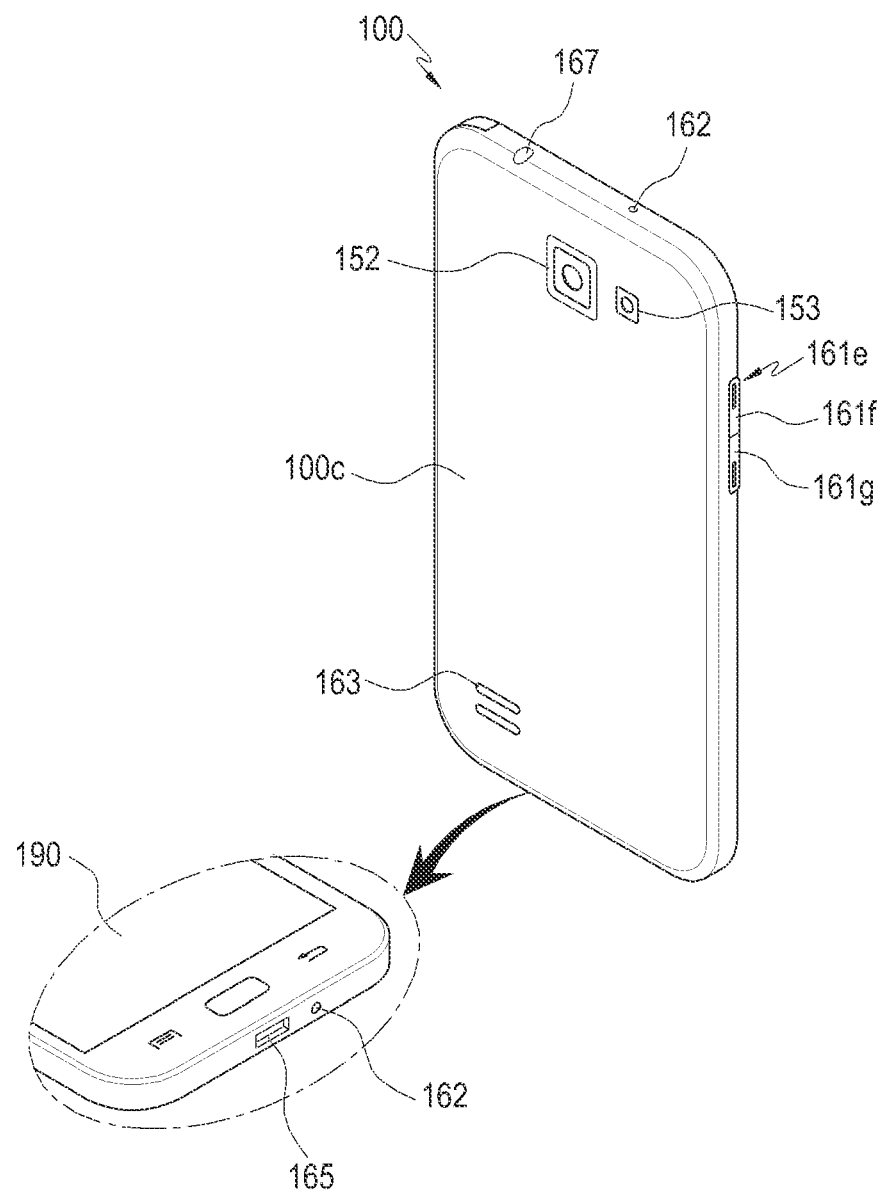
FIG. 3 is a perspective view of a back surface of a mobile device according to an exemplary embodiment of the present disclosure.

FIG. 2 is a perspective view of a front surface of a mobile device according to an exemplary embodiment of the present disclosure. FIG. 3 is a perspective view of a back surface of a mobile device according to an exemplary embodiment of the present disclosure.

With reference to FIGS. 2 and 3, the touch screen 190 is disposed in the center of a front surface 100a of the device 100. The touch screen 190 is formed to be large enough to cover most of the front surface 100a of the device 100. FIG. 2 is a diagram illustrating an example in which a main home screen is displayed on the touch screen 190. The main home screen is an initial screen displayed on the touch screen 190 when the device 100 is powered on. Further, if the device 100 has different home screens with several pages, the main screen may be the first home screen among the home screens with several pages. In the home screen, shortcut icons 191-1, 191-2, and 191-3 to execute frequently used applications, an application conversion key 191-4, time, the weather, or the like may be displayed. The application conversion key 191-4 is to display application icons indicating applications on the touch screen 190. Further, a status bar 192 that indicates a battery recharged state, intensity of the received signal, current time, and the like may be formed in the upper portion of the touch screen 190.

A home button 161a, a menu button 161b, and a back button 161c may be formed in the lower portion of the touch screen 190.

The home buttons 161a displays a main home screen on the touch screen 190. For example, when the main home screen and other home screens, or a menu screen is displayed on the touch screen 190, if the home button 161a is pressed (or touched), the main home screen may be displayed on the touch screen 190. In addition, if the home button 161a is pressed (or touched) during the execution of applications on the touch screen 190, the main home screen illustrated in FIG. 2 may be displayed on the touch screen 190. In addition, the home button 161a may be used for displaying recently used applications on the touch screen 190, or for displaying a task manager.

The menu button 161b provides a connection menu that can be used on the touch screen 190. The connection menu may include a widget-adding menu, a wallpaper-changing menu, a search menu, an editing menu, a configuration menu, or the like. In addition, the connection menu connected to the applications may be provided when executing the application.

The back button 161c may display a screen executed right before the currently executed screen, or may quit the most recently used application.

The first camera 151, an illuminance sensor 170a, and a proximity sensor 170b may be disposed on the edge of the front surface 100a of the device 100. The second camera 152, a flash 153, and a speaker 163 may be disposed on a back surface 100c of the device 100.

On a side surface 100b of the device 100, for example, a power/reset button 161d, a volume control button 161e including a volume up button 161f and a volume down button 161g, a land-based DMB antenna 141a for broadcasting reception, one or a plurality of microphones 162, or the like may be disposed. The DMB antenna 141a may be fixed to the device 100, or may be detachably attached to the device 100.

Further, the connector 165 is formed on the lower portion of the side surface of the device 100. In the connector 165, a plurality of electrodes are formed and may be connected to an external device by wire. The earphone connector jack 167 may be formed on the upper portion of the side surface of the device 100. An ear phone may be inserted to the earphone connector jack 167.

Figure 4:
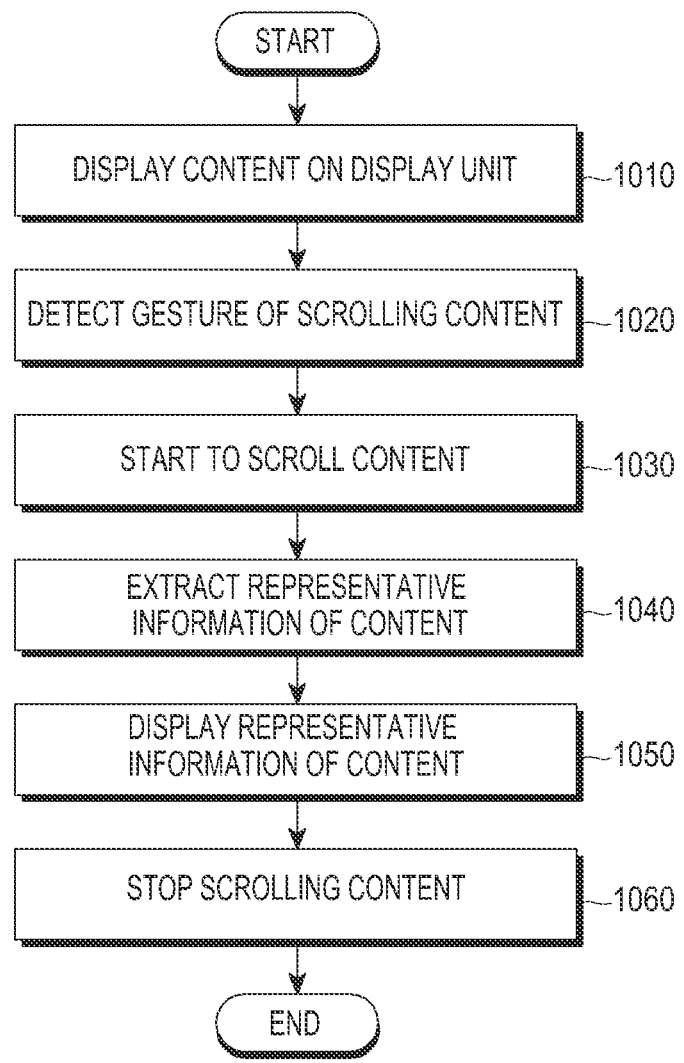
FIG. 4 is a flowchart illustrating a method of controlling an electronic apparatus that displays representative information when scrolling content according to an exemplary embodiment of the present disclosure.

FIG. 4 is a flowchart illustrating a method of controlling an electronic apparatus that displays representative information when scrolling content according to an exemplary embodiment of the present disclosure. Further, FIGS. 5A, 5B, 6A, and 6B are diagrams illustrating screens that display representative information when scrolling content according to an exemplary embodiment of the present disclosure.

With reference to FIG. 4, firstly, content is displayed on a display unit in operation 1010. The controller 110 of the electronic apparatus 100 displays the content on the display unit. Further, the content may be calendars executed in a calendar application, photographs executed in a gallery application, pages of a book executed in an e-book application, and list items included in a list view. FIGS. 5A, 5B, 6A, and 6B are diagrams illustrating examples in which the electronic apparatus 100 is a mobile device, and the content is a calendar executed in a calendar application. With reference to FIGS. 5A, 5B, 6A, and 6B, the controller 110 of the mobile device may display the content corresponding to the calendar executed in the calendar application on the display unit 190. In addition, the display unit may be formed to the touch screen 190. Accordingly, the controller 110 executes the calendar application, and displays the calendar on the touch screen 190. With reference to FIG. 5A, a calendar 200 resulted from a calendar application is displayed on the touch screen 190. For example, the controller 110 may display a title 202, a month and year 204, and a date 206 of the calendar application by executing the calendar application. In addition, the controller 110 may display a schedule 208 stored in the date 206. At this point, the controller 110 may display the calendar 200 on the upper portion of the touch screen 190, and the schedule 208 displays the calendar 200 on the lower portion of the touch screen 190. For example, the controller 110 may display the calendar 200 corresponding to March, on the touch screen 190.

Subsequently, a gesture of scrolling the content is detected in operation 1020. The controller 110 may detect the gesture of scrolling the content. At this point, the gesture may be a drag or a flick with respect to the content on the touch screen that forms the display unit. Further, the gesture may be a drag or a flick of a scroll bar.

For example, as illustrated in FIG. 5B, the gesture may be a drag or a flick 300 with respect to the content on the touch screen. That is, the calendar 200 corresponding to the content may be displayed on the touch screen 190, as described above. At this point, the gesture may be the drag or the flick 300 with respect to the calendar. For example, as illustrated in FIG. 6B, the gesture may be the drag or the flick 300 with respect to the calendar in an upward or downward direction.

Subsequently, if the gesture is detected, scrolling of the content is started in operation 1030. The controller 110 may start to scroll the content, if the gesture is detected. For example, the gesture may be the drag or flick 300 with respect to the calendar as illustrated in FIG. 5B. Accordingly, the controller 110 may start to scroll the calendar if the gesture corresponding to the drag or the flick 300 with respect to the calendar is detected.

Figures 6A, 6B:
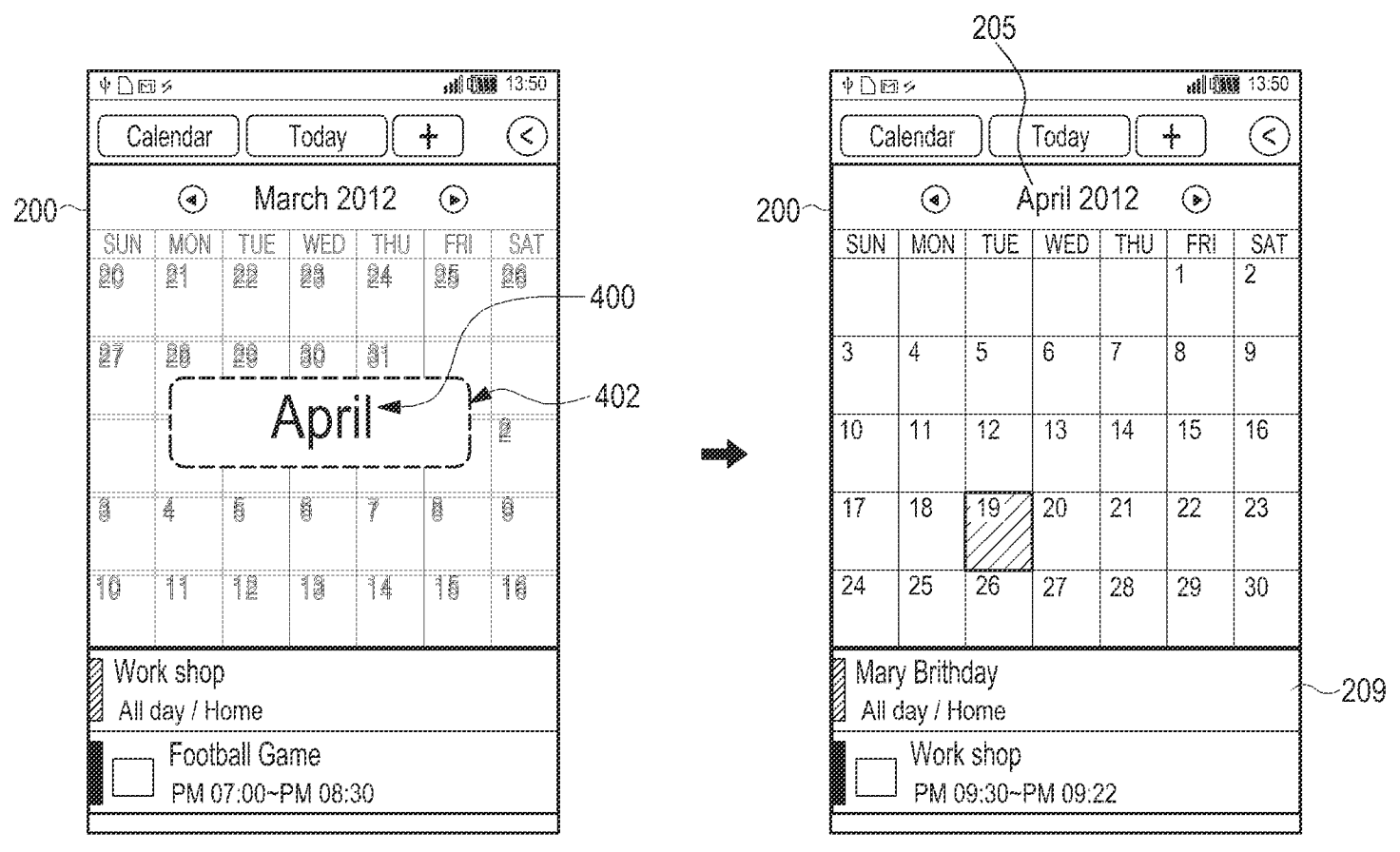

For example, if the drag or the flick 300 with respect to the calendar in the upward direction is detected as illustrated in FIG. 5B, the controller 110 may start to scroll the calendar as illustrated in FIG. 6A. At this point, the drag or the flick 300 with respect to the calendar in the upward direction may be a gesture of displaying the next month of the calendar. Accordingly, the controller 110 may start to perform scrolling to display the next month of the calendar, in response to the drag or the flick 300 with respect to the calendar in the upper direction. For example, the controller 110 may start to perform scrolling to display April corresponding to the next month of the calendar, in response to the drag or the flick 300 with respect to the calendar in the upper direction as illustrated in FIG. 6A. Accordingly, the controller 110 scrolls a calendar corresponding to March in the upper direction so that the calendar corresponding to March disappears, and simultaneously scrolls a calendar corresponding to April so that the calendar corresponding to April appears. For example, the controller 110 scrolls the calendar corresponding to March in the upper direction so that the first to third weeks of March disappear, and simultaneously scrolls the calendar corresponding to April in the upper direction so that the first to third weeks of April appear, as illustrated in FIG. 6A.

However, as the content is started to be scrolled, the content may not be easily recognized by the user due to the movement according to scrolling. That is, due to the movement according to scrolling the content, it may be difficult for the user to recognize what content is being displayed. For example, due to the movement according to scrolling the calendar, it may be difficult for the user to recognize which month the calendar displays as illustrated in FIG. 6A.

Subsequently, representative information of the content is extracted in operation 1040. The controller 110 may extract the representative information of the content. At this point, the controller 110 may extract information with the highest priority among plural items of information included in the content, as the representative information. At this point, the representative information may be fixed information, variable information, or user designated information. At this point, the fixed information refers to information of which the priority is fixed and does not change. In contrast, the variable information refers to information of which the priority can be changed. Further, the user designated information refers to information of which the priority is input by the designation of the user. Further, the fixed information may be a title, a tag, or a table of contents of the content. In addition, the variable information may be the number of views of the contents or the number of touch events.

The storage unit 175 may store plural items of information included in the contents. Further, the storage unit 175 may store priorities corresponding to respective plural items of information. At this point, the controller 110 may extract the information with the highest priority among the plural items of information included in the content from the storage unit 175, as the representative information.

For example, the calendar corresponding to the content may include the plural items of information corresponding to the month and year, the date, and the schedule. Further, the priorities corresponding to the month and year, the date, and the schedule that correspond to the plural items of information may be stored in the storage unit 175. At this point, the representative information may be fixed information. In addition, the fixed information may be a month of the calendar corresponding to the title of the content. Accordingly, the representative information may be a month of the calendar with the highest priority. In addition, the priority may not be changed. Therefore, the controller 110 may extract the month of the calendar with the highest priority among the plural items of information included in the calendar as the representative information. For example, April corresponding to the scrolled month of the calendar may be extracted as representative information of the calendar.

Subsequently, the representative information of the content is displayed in operation 1050. The controller 110 may display the extracted representative information of the content on the display unit. At this point, the representative information may be displayed in a stopped manner. Accordingly, as described above, since the representative information is displayed in a stopped manner, the representative information may be easily recognized by the user, while it is difficult for the user to recognize the content due to the movement according to scrolling the content.

For example, as illustrated in FIG. 6A, April corresponding to the month of the calendar which is extracted as representative information of the calendar may be displayed on the display unit 190. At this point, the April 400 corresponding to the representative information may be displayed in a window 402 in a stopped manner. Accordingly, even if it is difficult to recognize what month the scrolled month corresponds to, due to scrolling the calendar, since the April 400 corresponding to the representative information is displayed in a stopped manner, the user may easily recognize the scrolled month corresponds to April.

Therefore, according to an exemplary embodiment of the present disclosure, when scrolling content, the user may instantly recognize what the currently scrolled content is about, by displaying the representative information of the content.

Subsequently, scrolling the content is stopped in operation 1060. The controller 110 may stop scrolling the content. At this point, the controller 110 enables the representative information to disappear. For example, as illustrated in FIG. 6B, the controller 110 may stop scrolling the calendar corresponding to the content. That is, as illustrated in FIG. 6B, scrolling the calendar from the March 204 to the April 205 is stopped so that April is displayed on the display unit 190. At this point, as illustrated in FIG. 6B, the displayed "April" corresponding to the representative information may disappear. Further, a schedule 209 for April 19 corresponding to the 19th day which is the date 206 of April is displayed as illustrated in FIG. 6B.

FIGS. 7A, 7B, 8A, and 8B are diagrams illustrating screens that display representative information when scrolling content according to a first exemplary embodiment of the present disclosure.

With reference back to FIG. 4, firstly, content is displayed on the display unit in operation 1010. The controller 110 of the electronic apparatus 100 may display the content on the display unit. Further, the content may be photographs executed in a gallery application. FIGS. 7A, 7B, 8A, and 8B are diagrams illustrating examples in which the electronic apparatus 100 is a mobile device, and the content is photographs executed in a gallery application. With reference to FIGS. 7A, 7B, 8A, and 8B, the controller 110 of the mobile device may display the content corresponding to the photographs executed in the gallery application on the display unit 190. Further, the display unit may be formed with the touch screen 190. Therefore, the controller 110 may execute the gallery application, and display the photographs on the touch screen 190. With reference to FIG. 7A, photographs 210 resulting from the execution of the gallery application are displayed on the touch screen 190. For example, the controller 110 may display a title 212 of the gallery application and the photographs 210. At this point, the photographs 210 are orthogonally arranged with N rows and M columns in a grid form, and are displayed on the touch screen 190, as illustrated in FIGS. 7A to 8B. Further, the controller 110 may display the schedule 208 stored in the date 206.

Subsequently, a gesture of scrolling the content is detected in operation 1020. The controller 110 may detect a gesture of scrolling the content. At this point, the gesture may be a drag or a flick with respect to the content on the touch screen forming the display unit. In addition, the gesture may be a drag or a flick of a scroll bar.

For example, as illustrated in FIG. RB, the gesture may be a drag or a flick 310 with respect to the content on the touch screen. That is, the photographs 210 corresponding to the content may be displayed on the touch screen 190, as described above. At this point, the gesture may be the drag or the flick 310 with respect to the photographs. For example, as illustrated in FIG. 7B, the gesture may be the drag or the flick 310 with respect to the photographs in the left or right direction.

Subsequently, if the gesture is detected, scrolling the content is started in operation 1030. If the gesture is detected, the controller 110 may start to scroll the content. For example, the gesture may be the drag or the flick 310 with respect to the photograph as illustrated in FIG. 7B. Therefore, if the gesture corresponding to the drag or the flick 310 with respect to the photographs is detected, the controller 110 may start to scroll the photographs.

Figures 8A, 8B:
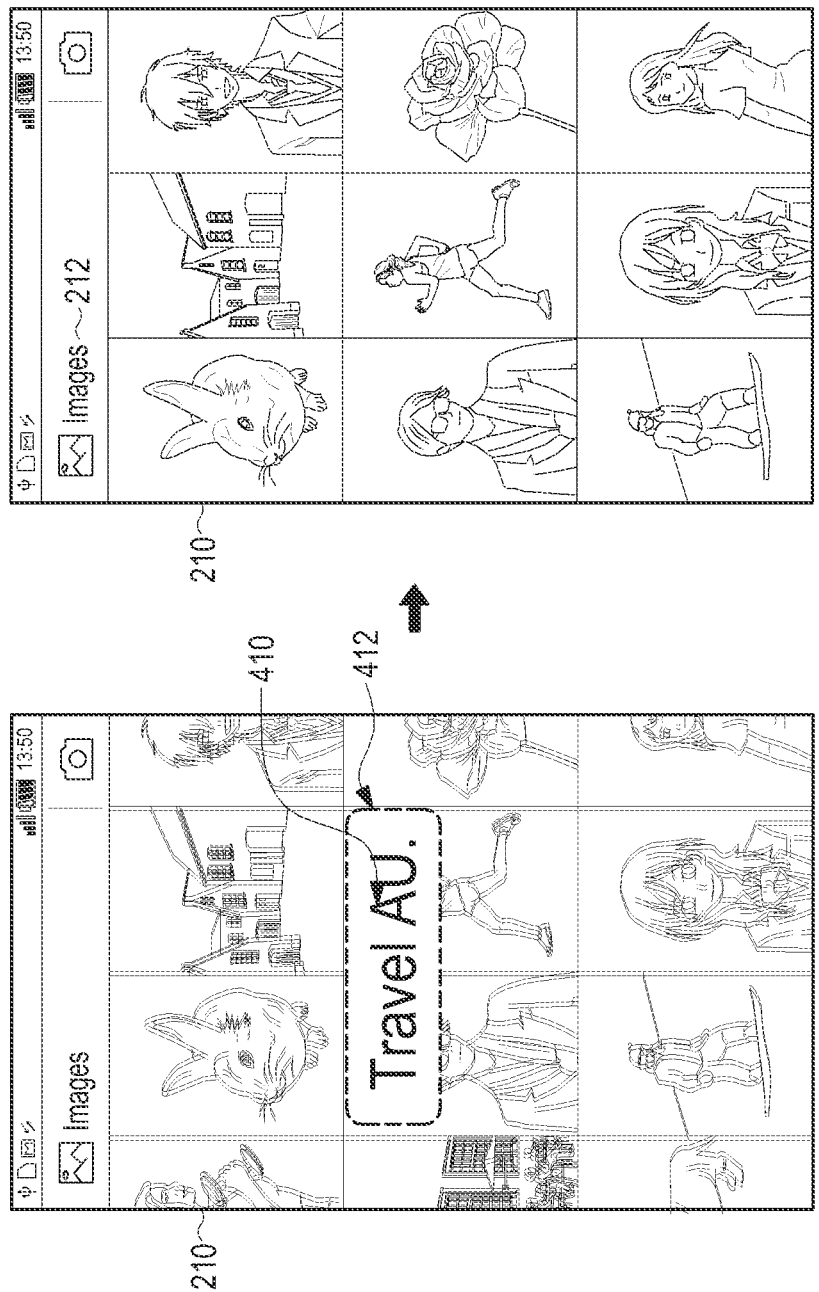

For example, if the drag or the flick 310 with respect to the photograph in the left direction is detected as illustrated in FIG. 7B, the controller 110 starts to scroll the photographs in the left direction as illustrated in FIG. 8A. At this point, the drag or the flick 310 with respect to the photographs in the left direction may be a gesture to scroll the photographs in the left direction and to perform display. Accordingly, the controller 110 may start to scroll the photographs in the left direction in response to the drag or the flick 310 with respect to the photographs in the left direction. For example, as illustrated in FIG. 8A, the controller 110 may start to scroll the photographs in the left direction in response to the drag or the flick 310 with respect to the photographs in the left direction. Therefore, the controller 110 may scroll the photographs in the left direction so that the photographs disappear, and simultaneously scroll photographs positioned on the right side of the disappeared photographs so that the photographs positioned on the right side appear. For example, as illustrated in FIG. 6A, the controller 110 scrolls photographs positioned on the first column in the left direction so that photographs positioned in the first column disappear, and simultaneously scroll photographs positioned in the fourth column in the left direction so that the photographs positioned in the fourth column appear.

However, as scrolling the content starts, it may be difficult for the user to recognize the content due to the movement according to scrolling. That is, it may be difficult for the user to recognize what content is being displayed, due to the movement of scrolling the content. For example, as illustrated in FIG. 8A, it may be difficult for the user to recognize which photograph the photograph is, due to the movement according to scrolling the photograph.

Subsequently, representative information of the content is extracted in operation 1040. The controller 110 may extract the representative information of the content. At this point, the controller 110 may extract information with the highest priority among plural items of information included in the content as the representative information. At this point, the representative information may be fixed information. At this point, the fixed information refers to information of which the priority is fixed and does not change. Further, the fixed information may be a title, a tag, or a table of contents of the content.

The plural items of information included in the content are stored in the storage unit 175. Further, the storage unit 175 may store priorities corresponding to the respective plural items of information. At this point, the controller 110 may extract information with the highest priority among the plural items of information included in the content from the storage unit 175, as the representative information.

For example, the photographs corresponding to the content may include the plurality items of information corresponding to images, photographers, captured dates, and tags. Further, priorities of the images, the photographers, the captured dates, and the tags corresponding to the plural items of information may be stored in the storage unit 175. The tags may be information attached to the image. For example, the tags may be names of events generated with respect to the photographs. For example, if the photographs are captured during a travel in Australia, the tags may be "Travel AU." In addition, the representative information may be fixed information. Further, the fixed information may be tags of the content. Accordingly, the representative information may be a tag of the photograph with the highest priority. In addition, the priority may not change. Accordingly, the controller 110 may extract the tag of the photograph with the highest priority among the plural items of information included in the photographs, as the representative information. For example, the "Travel AU" corresponding to the tags of the scrolled photographs may be extracted as the representative information of the photographs.

Subsequently, the representative information of the content is displayed in operation 1050. The controller 110 may display the extracted representative information of the content on the display unit. At this point, the representative information may be displayed in a stopped manner. Accordingly, as described above, since the representative information is displayed in a stopped manner, the representative information may be easily recognized by the user, while it is difficult for the user to recognize the content due to the movement according to scrolling the content.

For example, as illustrated in FIG. 8A, the 'Travel AU' 410 corresponding to the tags of the photograph extracted as the representative information of the photographs may be displayed in a window 412 on the display unit 190. At this point, the 'Travel AU' 410 corresponding to the representative information may be displayed in a stopped manner. Accordingly, even if it is difficult to recognize the scrolled photographs due to scrolling the photograph, the 'Travel AU' 410 corresponding to the representative information is displayed in a stopped manner, so that the user may easily recognize that the scrolled photographs correspond to photographs captured during the travel in Australia.

Therefore, according to an exemplary embodiment of the present disclosure, when scrolling the content, the representative information of the content is displayed, so that the user may instantly recognize what the currently scrolled content is about.

Subsequently, scrolling the content is stopped in operation 1060. The controller 110 may stop scrolling the content. At this point, the controller 110 may enable the displayed representative information to disappear. For example, as illustrated in FIG. 8B, the controller 110 may stop scrolling photographs corresponding to the content. That is, as illustrated in FIG. 8B, scrolling the photographs in the left direction is stopped and the photographs positioned in the fourth column may be displayed on the display unit 190. At this point, as illustrated in FIG. 8A, the 'Travel AU' corresponding to the displayed representative information may disappear.

FIGS. 9A, 9B, 10A, and 10B are diagrams illustrating screens that display representative information when scrolling content according to a second exemplary embodiment of the present disclosure.

With reference back to FIG. 4, firstly, the content is displayed on the display unit in operation 1010. The controller 110 of the electronic apparatus 100 is displayed on the display unit. Further, the content may be a page of a book executed in an e-book application. FIGS. 9A, 9B, 10A, and 10B are diagrams illustrating examples in which the electronic apparatus 100 is a mobile device, and the content is a page of a book executed in an e-book application. With reference to FIGS. 9A to 10B, the controller 110 of the mobile device may display the content corresponding to the book page executed in the e-book application on the display unit 190. Further, the display unit may be formed with the touch screen 190. Accordingly, the controller 110 may execute the e-book application, and display the book page on the touch screen 190. With reference to FIG. 9A, the book page 220 resulted from the execution of the e-book application is displayed on the touch screen 190. Also, the controller 110 may display a title 222 of the e-book application. For example, the controller 110 may display the appearance in the form of the book, a text of the book page, or the table of contents of the book page by executing the e-book application.

Subsequently, a gesture of scrolling the content is detected in operation 1020. The controller 110 may detect a gesture of scrolling the content. At this point, the gesture may be a drag or a flick with respect to the content on the touch screen that forms the display unit. In addition, the gesture may be a drag or a flick of a scroll bar.

For example, as illustrated in FIG. 9B, the gesture may be a drag or a flick 320 with respect to the content on the touch screen. That is, as described above, the book page 220 corresponding to the content may be displayed on the touch screen 190. At this point, the gesture may be the drag or the flick 320 with respect to the book page 220. For example, as illustrated in FIG. 9B, the gesture may be the drag or the flick 320 with respect to the book page in the left direction.

Subsequently, if the gesture is detected, scrolling the content is started in operation 1030. If the gesture is detected, the controller 110 starts to scroll the content. For example, as illustrated in FIG. 9B, the gesture may be the drag or the flick 320 with respect to the book page. Therefore, if the gesture corresponding to the drag or the flick 320 with respect to the book page is detected, the controller 110 starts to scroll the book page.

Figures 10A, 10B:
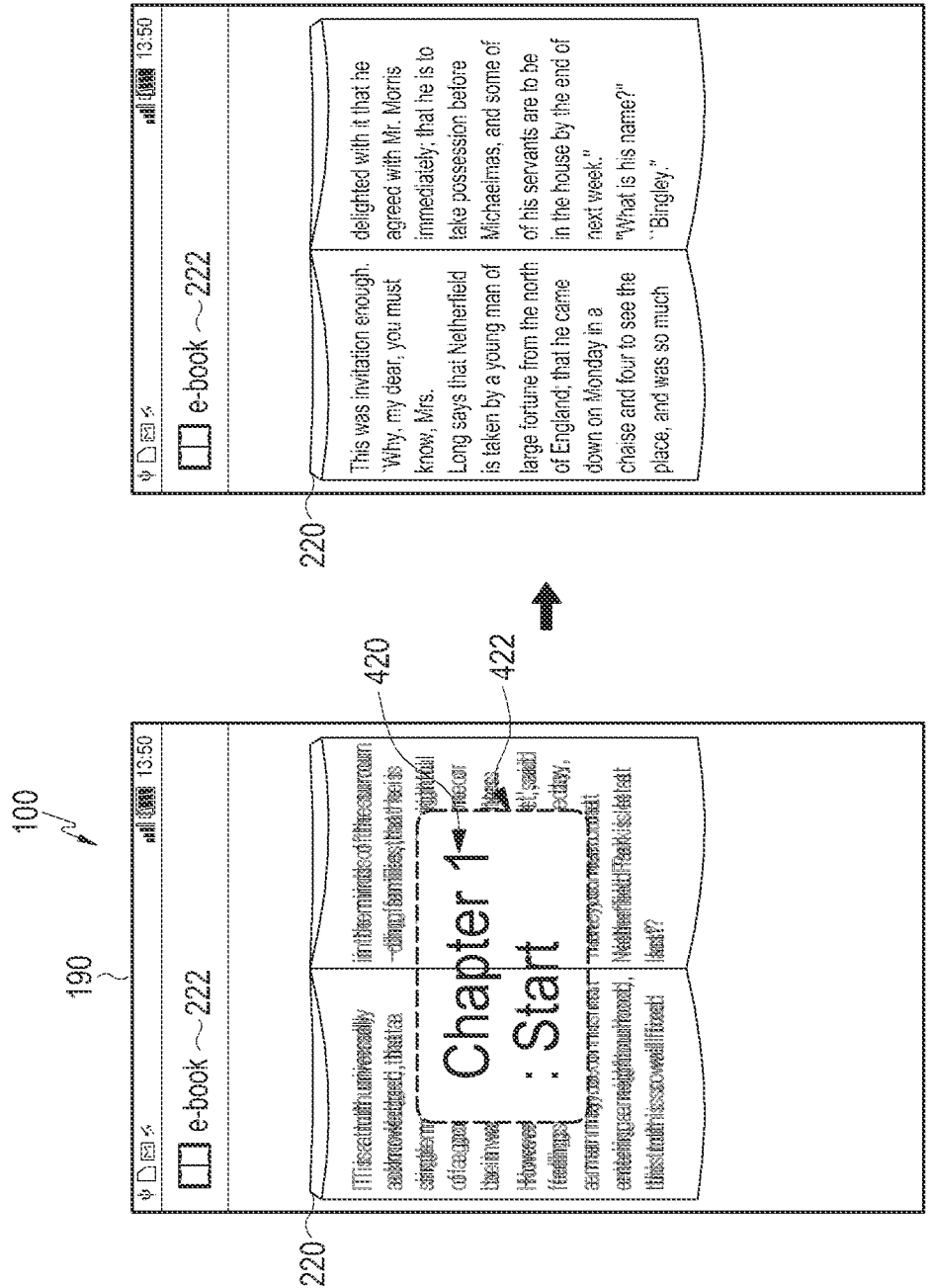

For example, if the drag or the flick 320 with respect to the book page 220 in the left direction is detected as illustrated FIG. 9B, the controller 110 starts to scroll the book page as illustrated in FIG. 10A. At this point, the drag or the flick 320 with respect to the book page in the left direction may be a gesture to display the next page of the book page. Therefore, the controller 110 may start to scroll the book page so that the next page of the book page is displayed, in response to the drag or the flick 320 with respect to the book page in the left direction. For example, as illustrated in FIG. 10A, the controller 110 starts to scroll the book page so that the next page of the book page is displayed, in response to the drag or the flick 320 with respect to the book page in the left direction. Therefore, the controller 110 may scroll the previous book page in the left direction so that the previous book page disappears, and may scroll the next book page to the left direction so that the next book page appears.

However, as scrolling the content starts, it may be difficult for the user to recognize the content due to the movement according to scrolling. That is, due to the movement according to scrolling the content, it may be difficult for the user to recognize what content is being displayed. For example, as illustrated in FIG. 10A, due to the movement according to scrolling the book page, it may be difficult for the user to recognize what book page is being displayed.

Subsequently, the representative information of the content is extracted in operation 1040. The controller 110 may extract the representative information of the content. At this point, the controller 110 may extract information with the highest priority among the plural items of information included in the content as the representative information. At this point, the representative information may be fixed information. At this point, the fixed information refers to information of which priority is fixed and does not change. In addition, the fixed information may be the table of contents of the content.

The plural items of information included in the content may be stored in the storage unit 175. At this point, the controller 110 may extract information with the highest priority among the plural items of information included in the content from the storage unit 175, as the representative information.

For example, the book page corresponding to the content may include the plural items of information corresponding to the appearance in the form of the book, the text of the book page, or the table of contents of the book page. In addition, the storage unit 175 may store the priorities that correspond to the appearance in the form of the book, the text of the book page corresponding to the plural items of information. At this point, the representative information may be fixed information. In addition, the fixed information may be a table of contents of the book corresponding to the table of contents of the content. Accordingly, the representative information may be a table of contents of the book page with the highest priority. In addition, the priority may not be changed. Accordingly, the controller 110 may extract the table of content of the book page with the highest priority among the plural items of information included in the book page as the representative information. For example, 'Chapter 1: Start' corresponding to the table of contents of the scrolled book page may be extracted as the representative information of the book page.

Subsequently, the representative information of the content is displayed in operation 1050. The controller 110 may display the extracted representative information of the content on the display unit. At this point, the representative information may be displayed in a stopped manner. Accordingly, as described above, since the representative information is displayed in a stopped manner, the representative information may be easily recognized by the user, while it is difficult for the user to recognize the content due to the movement according to scrolling the content.

For example, as illustrated in FIG. 10A, the "Chapter 1: Start" 420 corresponding to the table of content of the book page, which is extracted as representative information of the book page may be displayed in a window 422 on the display unit 190. At this point, the "Chapter 1: Start" 420 corresponding to the representative information may be displayed in a stopped manner. Accordingly, even if it is difficult to recognize what the scrolled book page corresponds to, due to scrolling the book page, the "Chapter 1: Start" 420 corresponding to the representative information is displayed in a stopped manner, so that the user may easily recognize that the table of the contents of the scrolled book page corresponds to "Chapter 1: Start."

Therefore, according to an exemplary embodiment of the present disclosure, when scrolling the content, the representative information of the content is displayed, so that the user may instantly recognize what the currently scrolled content is about.

Subsequently, scrolling the content is stopped in operation 1060. The controller 110 may stop scrolling the content. At this point, the controller 110 may enable the displayed representative information to disappear. For example, as illustrated in FIG. 10B, the controller 110 may stop scrolling the book page corresponding to the content. That is, as illustrated in FIG. 10B, scrolling the previous book page to the next book page may be stopped. At this point, as illustrated in FIG. 10B, the "Chapter 1: Start" corresponding to the displayed representative information may disappear.

FIGS. 11A and 11B, and FIGS. 12A and 12B are diagrams illustrating screens that display representative information when scrolling content according to another exemplary embodiment of the present disclosure.

Figures 11A, 11B:
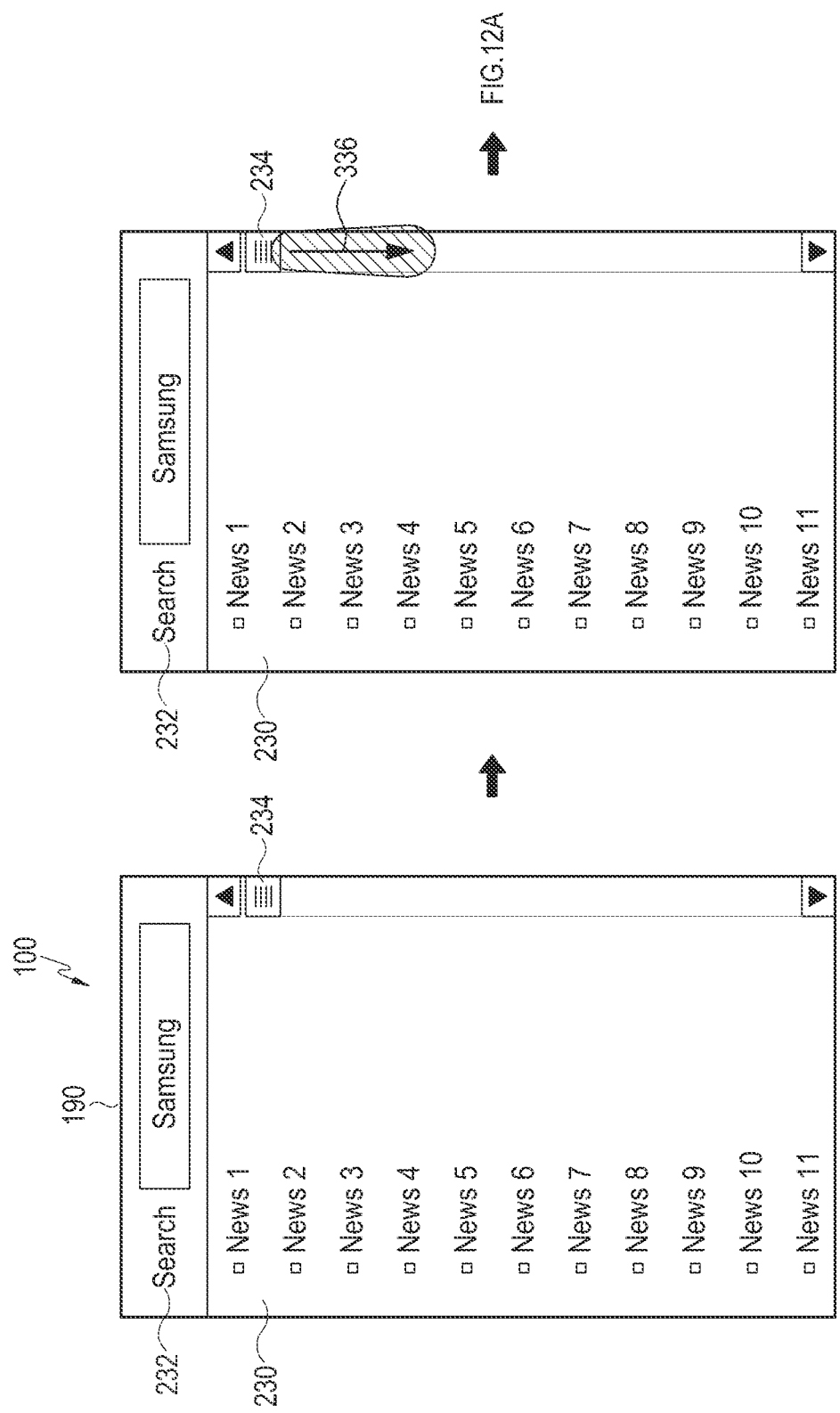
FIGS. 11A, 11B, 12A, and 12B are diagrams illustrating screens that display representative information when scrolling content according to another exemplary embodiment of the present disclosure.

With reference back to FIG. 4, firstly, the content is displayed on the display unit in operation 1010. The controller 110 of the electronic apparatus 100 is displayed on the display unit. In addition, the content may be list items included in a list view. With reference to FIGS. 11A and 11B, and FIGS. 12A and 12B, the controller 110 of the electronic apparatus 100 may execute the Internet application. Further, the controller 110 may display list items 230 searched by a search engine 232 on the display unit 190 as a list view. That is, with reference to FIG. 11A, a search box may be displayed by executing the Internet application. For example, if a search keyword "Samsung" is input to the search box, news articles about the "Samsung" are searched and displayed as illustrated in FIG. 11A. At this point, the controller 110 may display the news articles about "Samsung" as list items included in the list view. That is, the controller 110 may display the searched news articles about "Samsung" as a list view including the list items 230. For example, the searched news articles about "Samsung" may be displayed as a list view including the list items 230 from News 1 to News 11.

Subsequently, a gesture of scrolling the content is detected in operation 1020. The controller 110 may detect a gesture of scrolling the content. At this point, the gesture may be a drag or flick of a scroll bar displayed on the display unit. For example, as illustrated in FIG. 11B, the gesture may be a drag or flick 336 with respect to the scroll bar 234 positioned in the right portion of the display unit 190. In addition, the drag or flick 336 may be performed by a cursor displayed on the display unit 190. For example, as illustrated in FIG. 11B, the gesture may be the drag or flick 336 with respect to the scroll bar 234 to the downward direction.

Subsequently, if the gesture is detected, scrolling the content starts in operation 1030. If the gesture is detected, the controller 110 starts to scroll the contents. For example, the gesture may be the drag or flick 336 with respect to the scroll bar 234 as illustrated in FIG. 11B. Therefore, if the gesture corresponding to the drag or flick 336 with respect to the scroll bar 234 is detected, the controller 110 may start to scroll the list items.

Figures 12A, 12B:
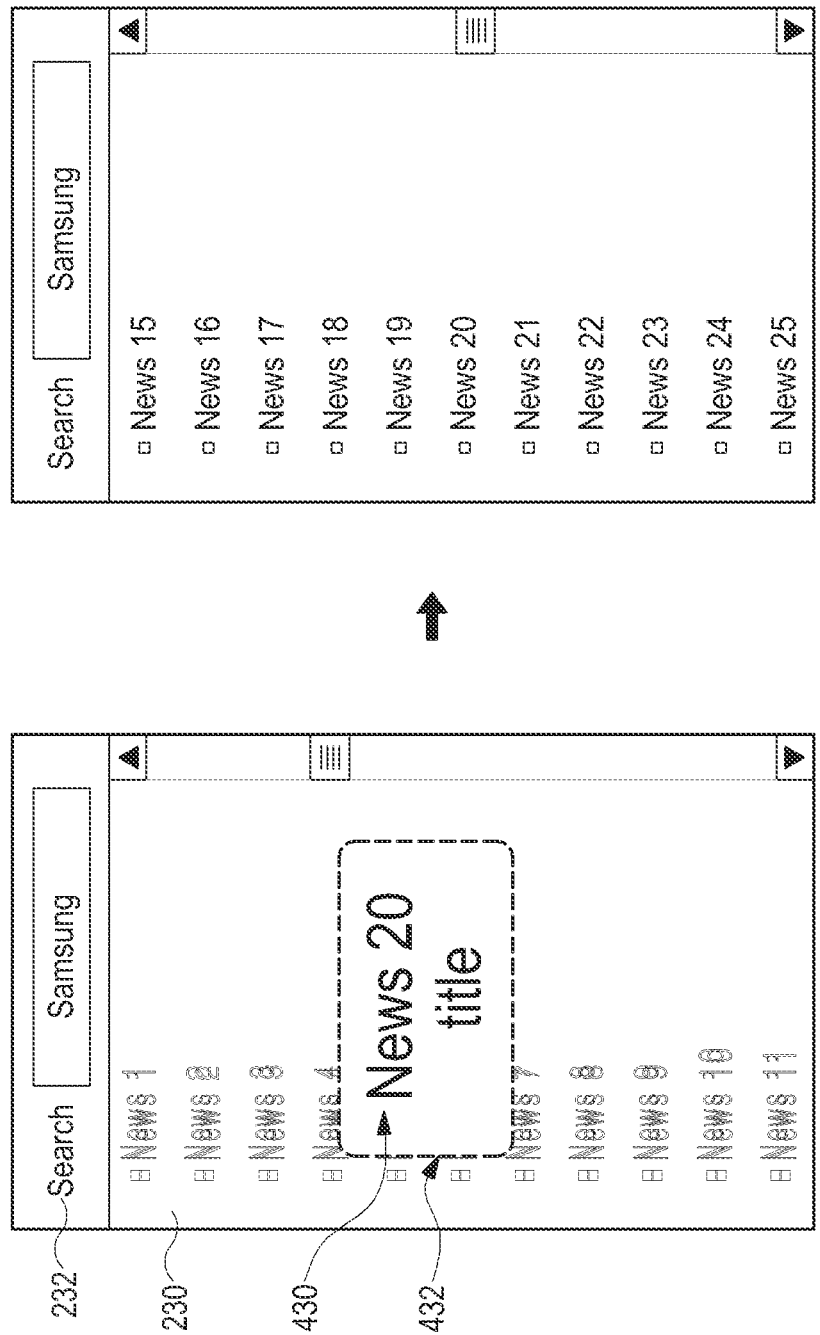

For example, as illustrated in FIG. 11B, if the drag or flick 336 with respect to the scroll bar 234 to the downward direction is detected as illustrated in FIG. 11B, the controller 110 may start to scroll the list items as illustrated in FIG. 12A. At this point, the drag or flick 336 with respect to the scroll bar 234 to the downward direction may be a gesture to display the next item of the list items. Accordingly, the controller 110 may start to scroll the list items so that the next item of the list items is displayed, in response to the drag or flick 336 with respect to the scroll bar 234 to the downward direction. For example, as illustrated in FIG. 12A, the controller 110 start to scroll the list items so that the items after News 13 corresponding to the next item of the list items are displayed, in response to the drag or flick 336 with respect to the scroll bar 234 to the downward direction. Accordingly, the controller 110 may scroll the list items from News 1 to News 11 to the upward direction so that the list items from News 1 to News 11 disappear, and simultaneously scroll the list items after News 12 to the upward direction so that the list items after News 12 appear. For example, as illustrated in FIG. 12A, the controller 110 may scroll the list items from News 1 to News 11 to the upward direction so that the list items from News 1 to News 11 disappear, and simultaneously scroll the list items after News 12 to the upward direction so that the list items after News 12 appear.

However, as scrolling the content starts, it may be difficult for the user to recognize the content due to the movement according to scrolling. That is, due to the movement according to scrolling the content, it may be difficult for the user to recognize what content is being displayed. For example, as illustrated in FIG. 12A, due to the movement according to scrolling the list items, it may be difficult for the user to recognize what book page is being displayed.

Subsequently, representative information of the content is extracted in operation 1040. The controller 110 may extract the representative information of the content. At this point, the controller 110 may extract a list item with the highest priority among the plurality of list items included in the content, as the representative information. Further, the priority may be determined based on the number of views of the contents or the number of touch events. Further, the storage unit 175 may store the plurality of list items included in the content. Further, the priorities included in the respective list items may be stored in the storage unit 175. Accordingly, the controller 110 may extract the list item with the highest priority among the plurality of list items included in the content from the storage unit 175, as the representative information.

For example, as illustrated in FIG. 11A, the controller 110 may display the plurality of list items 230 found by an Internet search engine 232 on the display unit 190, as a list view. In addition, the controller 110 may extract a list item with the highest priority among the plurality of list items 230 as the representative information. Further, the priority may be determined, for example, by the number of views of the content. For example, if the number of views of the list item corresponding to News 20 is the largest, the priority of the list item corresponding to News 20 may be determined to be the highest. Accordingly, the controller 110 may extract the list item corresponding to News 20, as representative information.

Further, the representative information may be variable information. At this point, the variable information refers to information of which the priority can be changed. That is, the priority of the representative information can be changed, since the number of views of the content or the number of touch events can be consistently updated. For example, if the representative information is the number of views corresponding to the variable information, a list item that has the largest number of views may be changed depending on the update of the number of views. Accordingly, the controller 110 may extract the representative information by charging the priority depending on the updated number of views.

Subsequently, the representative information of the content is displayed in operation 1050. The controller 110 may display the extracted representative information of the content on the display unit. At this point, the representative information is displayed in a stopped manner. Accordingly, as described above, since the representative information is displayed in a stopped manner, the representative information may be easily recognized by the user, while it is difficult for the user to recognize the content due to the movement according to scrolling the content.

For example, as illustrated in FIG. 12A, the controller 110 may display News 20 corresponding to the list item extracted as the representative information as "News 20 title" 430 in a window 432 on the display unit 190. At this point, the "News 20 title" 430 corresponding to the representative information is displayed in a stopped manner. Accordingly, as the list items are scrolled, even if it is difficult to recognize the scrolled list items, since the "News 20 title" 430 corresponding to the representative information is displayed in a stopped manner, it is possible to provide the user with the representative information among the currently scrolled list items. Accordingly, the user may recognize representative information with the largest number of views among the plurality of currently scrolled list items. Therefore, when scrolling the content, the user may recognize the representative information in addition to the scrolling function.

Therefore, according to another exemplary embodiment of the present disclosure, when scrolling the list items corresponding to the content, it is possible to display and provide the representative information of the list items in addition to the scrolling function.

Subsequently, scrolling the content is stopped in operation 1060. The controller 110 may stop scrolling the content. At this point, the controller 110 may enable the displayed representative information to disappear. For example, as illustrated in FIG. 12B, the controller 110 may stop scrolling the list items corresponding to the content. That is, as illustrated in FIG. 12B, scrolling list items to a list item of News 25 is stopped and the list items to a list item of News 25 may be displayed on the display unit 190. At this point, as illustrated in FIG. 12B, the "News 20 title" 430 corresponding to the displayed representative information may disappear.

FIGS. 13A and 13B, and FIGS. 14A and 14B are diagrams illustrating screens that display the representative information when scrolling content according to another exemplary embodiment of the present disclosure.

With reference back to FIG. 4, firstly, the content is displayed on the display unit in operation 1010. The controller 110 of the electronic apparatus 100 is displayed on the display unit. In addition, the content may be list items included in a list view. With reference to FIGS. 13A and 13B, and FIGS. 14A and 14B, the controller 110 of the electronic apparatus 100 may execute a stock application. Further, the controller 110 may display list items 240 displayed by a stock application 242 on the display unit 190 as a list view. For example, with reference to FIG. 13A, the controller 110 displays the list items 240 displayed on the stock application 242 on the display unit 190 as a list view. In FIG. 13A, the list items 240 from Stock 1 to Stock 11 are displayed as a list view.

Subsequently, a gesture of scrolling the content is detected in operation 1020. The controller 110 may detect the gesture of scrolling the content. At this point, the gesture may be a drag or a flick of a scroll bar displayed on the display unit. For example, as illustrated in FIG. 11B, the gesture may be a drag or a flick 340 with respect to the scroll bar 234 positioned on the right portion of the display unit 190. Further, the drag or the flick 340 may be performed by a cursor displayed on the display unit 190. For example, as illustrated in FIG. 13B, the gesture may be the drag or the flick 340 with respect to the scroll bar 234 in the downward direction.

Subsequently, if the gesture is detected, scrolling the content starts in operation 1030. If the gesture is detected, the controller 110 starts to scroll the content. For example, the gesture may be the drag or the flick 340 with respect to the scroll bar 234 as illustrated in FIG. 13B. Accordingly, if the gesture corresponding to the drag or the flick 340 with respect to the scroll bar 234 is detected, the controller 110 starts to scroll the list items.

Figures 14A, 14B:

For example, as illustrated in FIG. 13B, if the drag or the flick 340 with respect to the scroll bar 234 in the downward direction is detected, the controller 110 starts to scroll the list items as illustrated in FIG. 14A. At this point, the drag or the flick 340 with respect to the scroll bar 234 in the downward direction may be a gesture to display the next item of the list items. Accordingly, the controller 110 may start to scroll the list items so that the next item of the list items is displayed, in response to the drag or the flick 340 with respect to the scroll bar 234 in the downward direction. For example, as illustrated in FIG. 14A, the controller 110 may start to scroll the item lists so that items after Stock 11 corresponding to the next item of the list items is displayed, in response to the drag or the flick 340 with respect to the scroll bar 234 in the downward direction. Accordingly, the controller 110 may scroll the list items from Stock 1 to Stock 11 in the upward direction so that the list items from Stock 1 to Stock 11 disappear, and simultaneously scroll list items after Stock 12 in the upward direction so that the list items after Stock 12 appear. For example, as illustrated in FIG. 14A, the controller 110 may scroll the list items from Stock 1 to Stock 11 in the upward direction so that the list items from Stock 1 to Stock 11 disappear, and simultaneously scroll list items after Stock 12 in the upward direction so that the list items after Stock 12 appear.

However, as scrolling the content starts, it may be difficult for the user to recognize the content due to the movement according to scrolling the content. That is, it may be difficult for the user to recognize what content is being displayed, due to the movement according to scrolling the content. For example, as illustrated in FIG. 14A, it may be difficult for the user to recognize what list items are being displayed, due to the movement according to scrolling the list items.

Subsequently, the representative information of the content is extracted in operation 1040. The controller 110 may extract the representative information of the content. At this point, the controller 110 may extract information with the highest priority among the plural items of information included in the content as the representative information. At this point, the representative information may be user designated information. The user designated information refers to information of which the priority is input by the user designation. Further, the storage unit 175 may store a plurality of list items included in the content. In addition, the storage unit 175 may store priorities determined by the user designation with respect to the plurality of list items. Accordingly, the controller 110 may load the priorities stored in the storage unit 175 and may extract a list item with the highest priority as representative information.

For example, as illustrated in FIG. 13A, the controller 110 may display the plurality of list items 240 displayed on the stock application 242 on the display unit 190, as a list view. In addition, the controller 110 may extract a list item with the highest priority among the plurality of list items 230, as the representative information. In addition, the priority may be determined by the user designation. For example, if the priority of a list item corresponding to Stock 11 is designated to be the highest by the user, the controller 110 may extract the list item corresponding to Stock 11 as representative information.

Subsequently, representative information of the content is displayed in operation 1050. The controller 110 may display the extracted representative information of the content on the display unit. At this point, the representative information is displayed in a stopped manner. As described above, since the representative information is displayed in a stopped manner, the representative information may be easily recognized by the user, while it is difficult for the user to recognize the content due to the movement according to scrolling the content.

For example, as illustrated in FIG. 14A, the controller 110 may display Stock 11 corresponding to the list item extracted as the representative information in a window 442 on the display unit 190 as "Stock 11: Samsung" 440. At this point, the "Stock 11: Samsung" 440 corresponding to the representative information may be displayed in a stopped manner. Accordingly, as the list item is scrolled, even if it is difficult to recognize the scrolled list item, the "Stock 11: Samsung" 440 corresponding to the representative information is displayed in a stopped manner so that the representative information among the currently scrolled list items may be provided with the user. Accordingly, the user may recognize the representative information with the highest priority designated by the user among the currently scrolled list items. Accordingly, when scrolling the content, the user may recognize the representative information in addition to the scrolling function.

Therefore, according to another exemplary embodiment of the present disclosure, when scrolling the list items corresponding to the content, it is possible to display and provide the representative information of the list items in addition to the scrolling function.

Subsequently, scrolling the content is stopped in operation 1060. The controller 110 may stop scrolling the content. At this point, the controller 110 may enable the displayed representative information to disappear. For example, as illustrated in FIG. 14B, the controller 110 may stop scrolling the list items corresponding to the content. That is, as illustrated in FIG. 14B, scrolling list items to a list item corresponding to Stock 33 stops and the list items to the list item corresponding to Stock 33 are displayed on the display unit 190. At this point, as illustrated in FIG. 14B, the "Stock 11: Samsung" 440 corresponding to the displayed representative information may disappear.

It may be understood that exemplary embodiments of the present disclosure may be implemented by hardware or a combination of hardware and software. The optional software may be stored in a volatile or non-volatile storage unit such as a ROM, a memory such as a RAM, a memory chip, or an integrated circuit, an optically or magnetically recordable and machine-readable (for example, computer-readable) storage unit such as a Compact Disc (CD), a Digital Versatile Disc (DVD), a magnetic disc, or a magnetic tape, regardless of eras ability or re-writ ability. A method of updating a graphic screen may be implemented by a computer or a portable device including a controller or a memory, and the memory is an example of a machine-readable storage medium appropriate for storing a program or programs including instructions to implement exemplary embodiments of the present disclosure. Accordingly, an exemplary embodiment of the present disclosure includes programs including codes to implement apparatuses or methods described in any claims of the present disclosure or a machine-readable (for example, computer-readable) storage medium storing the programs. Further, such programs may be electronically transmitted via optional media such as a communication signal transmitted by wire or wirelessly, and equivalents thereof.

In addition, the terminal or the server may receive the programs from a program providing apparatus connected by wire or wirelessly, and may store the program. The terminal or the server may include a memory for storing programs including instructions that enable the terminal or the server to perform predetermined content protection methods, information required for the content protection methods, or the like, a communication unit for performing wired or wireless communications with the graphic processing apparatus, and a controller for transmitting the corresponding programs to the transmitting and receiving apparatuses automatically or under the request of the graphic processing apparatus.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a touchscreen display; and
   at least one processor, wherein the at least one processor is configured to:
      display, via the touchscreen display, a first execution screen of a calendar application, wherein the first execution screen of the calendar application includes information on a first month and information on a plurality of dates with respect to the first month,
      receive, via the touchscreen display, a scroll input with respect to the first execution screen while the first execution screen is displayed on the touchscreen display,
      in response to receiving the scroll input, at least temporally display, via the touchscreen display, a second execution screen of the calendar application, wherein the second execution screen includes information on a part of the plurality of dates with respect to the first month and information on a part of a plurality of dates with respect to a second month newly displayed on the touchscreen display, and
      display, via the touchscreen display, information on the second month in a stopped manner, while the part of the plurality of dates with respect to the first month and information on the part of a plurality of dates with respect to the second month newly displayed on the touchscreen display are displayed on the touchscreen display,
   wherein the information on the second month includes text information representing the second month.

2. The electronic device of claim 1, wherein the information on the second month is displayed on a second layer different form a first layer on which the second execution screen is displayed.

3. The electronic device of claim 1, wherein the at least one processor is further configured to, when the scroll input is detected, identify the information on the second month and information on an event corresponding to a first date of the second month.

4. The electronic device of claim 1, wherein the at least one processor is further configured to, when the scroll input is released, display, via the touchscreen display, a third execution screen of the calendar application.

5. The electronic device of claim 4, wherein the information on the second month is not displayed on the third execution screen of the calendar application.

6. A method for controlling an electronic device, comprising:
   displaying, via a touchscreen display of the electronic device, a first execution screen of a calendar application, wherein the first execution screen of the calendar application includes information on a first month and information on a plurality of dates with respect to the first month;
   receiving, via the touchscreen display, a scroll input with respect to the first execution screen while the first execution screen is displayed on the touchscreen display;
   in response to receiving the scroll input, at least temporally displaying, via the touchscreen display, a second execution screen of the calendar application, wherein the second execution screen includes information on a part of the plurality of dates with respect to the first month and information on a part of a plurality of dates with respect to a second month newly displayed on the touchscreen display; and
   displaying, via the touchscreen display, information on the second month in a stopped manner, while the part of the plurality of dates with respect to the first month and information on the part of a plurality of dates with respect to the second month newly displayed on the touchscreen display are displayed on the touchscreen display,
   wherein the information on the second month includes text information representing the second month.

7. The method of claim 6, wherein the information on the second month is displayed on a second layer different form a first layer on which the second execution screen is displayed.

8. The method of claim 6, further comprising, when the scroll input is detected, identifying the information on the second month and information on an event corresponding to a first date of the second month.

9. The method of claim 6, further comprising, when the scroll input is released, displaying, via the touchscreen display, a third execution screen of the calendar application.

10. The method of claim 9, wherein the information on the second month is not displayed on the third execution screen of the calendar application.

\* \* \* \* \*